United States Patent
Morimoto et al.

(10) Patent No.: US 9,096,781 B2
(45) Date of Patent: Aug. 4, 2015

(54) RE-PEELABLE WATER DISPERSION TYPE ACRYL-BASED PRESSURE-SENSITIVE ADHESIVE COMPOSITION, AND PRESSURE-SENSITIVE ADHESIVE SHEET

(71) Applicant: Nitto Denko Corporation, Ibaraki-shi, Osaka (JP)

(72) Inventors: Yu Morimoto, Ibaraki (JP); Kousuke Yonezaki, Ibaraki (JP); Tatsumi Amano, Ibaraki (JP); Kazuma Mitsui, Ibaraki (JP); Kyoko Takashima, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 131 days.

(21) Appl. No.: 13/891,592

(22) Filed: May 10, 2013

(65) Prior Publication Data

US 2013/0303669 A1    Nov. 14, 2013

(30) Foreign Application Priority Data

May 11, 2012    (JP) ................................. 2012-109531

(51) Int. Cl.
- C09J 133/02 (2006.01)
- C08L 101/04 (2006.01)
- C09J 133/04 (2006.01)
- C09J 133/16 (2006.01)

(52) U.S. Cl.
CPC ............ C09J 133/02 (2013.01); C08L 101/04 (2013.01); C09J 133/04 (2013.01); C09J 133/16 (2013.01); C08L 2201/54 (2013.01)

(58) Field of Classification Search
None
See application file for complete search history.

(56) References Cited

U.S. PATENT DOCUMENTS

| 5,468,812 A * | 11/1995 | Muggli et al. ................ 525/293 |
| 7,799,853 B2 * | 9/2010 | Ukei et al. ...................... 524/99 |
| 2009/0317634 A1 * | 12/2009 | Suh .............................. 428/354 |

FOREIGN PATENT DOCUMENTS

| JP | 09-165460 | 6/1997 |
| JP | 11-000961 | 1/1999 |
| JP | 2001-064607 | 3/2001 |
| JP | 2001-131512 | 5/2001 |
| JP | 2003-027026 | 1/2003 |
| JP | 381490 B2 | 8/2006 |

* cited by examiner

Primary Examiner — Satya Sastri
(74) Attorney, Agent, or Firm — Knobbe Martens Olson & Bear, LLP

(57) ABSTRACT

An aim of the prevention invention is to provide a water dispersion type acryl-based pressure-sensitive adhesive composition for re-peeling, which can prevent electrification of an adherend at the time of peeling (peeling antistatic properties) and which can form a pressure-sensitive adhesive layer excellent in adherability and re-peelable properties, and also to provide a pressure-sensitive adhesive sheet having a pressure-sensitive adhesive layer formed of the pressure-sensitive adhesive composition. The re-peelable water dispersion type acryl-based pressure-sensitive adhesive composition of the present invention contains an acrylic emulsion-based polymer composed of a (meth)acrylic acid alkyl ester and a carboxyl-containing unsaturated monomer as raw material monomers, a perfluoroalkyl-containing oligomer, and an ionic compound.

15 Claims, 1 Drawing Sheet

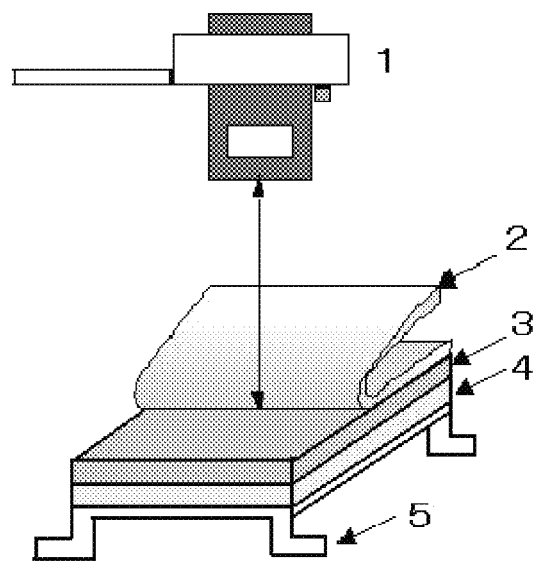

RE-PEELABLE WATER DISPERSION TYPE ACRYL-BASED PRESSURE-SENSITIVE ADHESIVE COMPOSITION, AND PRESSURE-SENSITIVE ADHESIVE SHEET

This application claims priority to Japanese Patent Application No. 2012-109531, filed May 11, 2012. The aforementioned application is incorporated by reference in its entirety.

BACKGROUND OF THE INVENTION

1. Field of the Invention

The present invention relates to a water dispersion type acryl-based pressure-sensitive adhesive composition which can form a re-peelable pressure-sensitive adhesive layer. More particularly, the present invention relates to a re-peelable water dispersion type acryl-based pressure-sensitive adhesive composition which can form a pressure-sensitive adhesive layer excellent in antistatic properties (peeling antistatic properties), adherability, and re-peelable properties, and also to a pressure-sensitive adhesive sheet having a pressure-sensitive adhesive layer including the above-mentioned pressure-sensitive adhesive composition.

2. Description of the Related Art

In the production and processing processes of an optical member (optical material) represented by an optical film to be used for a polarizing plate, a retardation plate, a reflection prevention plate, etc., for a purpose of preventing scratching and staining on the surface, improving the cutting processibility, suppressing cracks, and the like, a surface protecting film is used while being stuck to the surface of the optical member (see Patent publication 1 and 2). As the surface protecting film, a re-peelable pressure-sensitive adhesive sheet obtained by forming a re-peelable pressure-sensitive adhesive layer on the surface of a plastic film substrate has been usually used.

Previously, solvent type acryl-based pressure-sensitive adhesives have been used as a pressure-sensitive adhesive for surface protecting films (see J Patent publication 1 and 2); however since these solvent type acryl-based pressure-sensitive adhesives contain an organic solvent, it has been tried to replace these solvent type acryl-based pressure-sensitive adhesives with water dispersion type acryl-based pressure-sensitive adhesives from the viewpoint of working environments at the time of application (see Patent publication 3, 4 and 5).

These surface protecting films are required to have sufficient adherability (tackiness) during the time the surface protecting films are stuck to optical members. Further, these surface protecting films are required to have excellent peelable (re-peelable) properties since the surface protecting films are peeled after used in the production process for optical members.

In general, surface protecting films or optical members are made of a plastic material, and thus have high electrical insulating properties and generate static electricity at the time of friction or peeling off. Accordingly, when a surface protecting film is peeled off from an optical member such as a polarizing plate, static electricity is generated and when a voltage is applied to a liquid crystal in the state that the static electricity generated at that time remains as it is, it leads to problems such that orientation of liquid crystal molecules is lost or a defect occurs in a panel.

Further, the existence of static electricity may possibly cause other problems of attraction of dust and waste or deterioration of workability. Accordingly, in order to solve the above-mentioned problems, surface protecting films are subjected to various kinds of antistatic treatments.

Disclosed, as a trial for suppressing electrification of static electricity, is a method for performing antistatic treatment by adding a surfactant with a low molecular weight to a pressure-sensitive adhesive and transferring the surfactant to an object to be protected from the pressure-sensitive adhesive (e.g., see Patent publication 6). However, in this method, the added surfactant with a low molecular weight easily bleeds to the pressure-sensitive adhesive surface and in the case where the method is employed for a surface protecting film, there is a concern of staining of an adherend (an object to be protected).

Further, in use as a surface protecting film (particularly, use as a surface protecting film for an optical member), residue (so-called "adhesive residue") of a pressure-sensitive adhesive on the surface of an adherend (optical member, etc.) at the time of peeling a pressure-sensitive adhesive sheet becomes a problem, e.g., an adverse effect on optical properties of an optical member, and therefore, a pressure-sensitive adhesive and a pressure-sensitive adhesive layer are required to be excellent in easy peeling properties (re-peelable properties).

[Patent publication 1] JP-A-11-961
[Patent publication 2] JP-A-2001-64607
[Patent publication 3] JP-A-2001-131512
[Patent publication 4] JP-A-2003-27026
[Patent publication 5] JP-B1-3810490
[Patent publication 6] JP-A-09-165460

SUMMARY OF THE INVENTION

Problem to be Solved by the Invention

However, as described above, the foregoing problems have not been solved yet in good balance by any of the above means, and in a technical field relevant to electronic appliances where electrification becomes a particularly serious problem, it is difficult to satisfy further demands for improvement of a surface protecting film having antistatic properties or the like, and presently, a water dispersion type acryl-based pressure-sensitive adhesive having excellent re-peelable properties have not been obtained.

Accordingly, an aim of the prevention invention is to provide a water dispersion type acryl-based pressure-sensitive adhesive composition for re-peeling, which can prevent electrification of an adherend at the time of peeling (antistatic properties) and which can form a pressure-sensitive adhesive layer excellent in adherability and re-peelable properties, and also to provide a pressure-sensitive adhesive sheet having a pressure-sensitive adhesive layer formed of the pressure-sensitive adhesive composition.

Means for Solving the Problems

The inventors of the present invention have made various investigations to achieve the above-mentioned aim and found that a re-peelable water dispersion type acryl-based pressure-sensitive adhesive composition containing a specified acrylic emulsion-based polymer produced from raw material monomers with a specified composition, a perfluoroalkyl-containing oligomer, and an ionic compound as constituent components and capable of forming a pressure-sensitive adhesive layer excellent in antistatic properties, adherability, and re-peelable properties, and thus have completed the present invention.

That is, a re-peelable water dispersion type acryl-based pressure-sensitive adhesive composition according to the present invention has a feature of containing an acrylic emulsion-based polymer composed of a (meth)acrylic acid alkyl ester and a carboxyl-containing unsaturated monomer as raw material monomers, a perfluoroalkyl-containing oligomer, and an ionic compound.

The re-peelable water dispersion type acryl-based pressure-sensitive adhesive composition of the present invention is a re-peelable water dispersion type acryl-based pressure-sensitive adhesive composition containing an acrylic emulsion-based polymer composed of a (meth)acrylic acid alkyl ester and a carboxyl-containing unsaturated monomer as raw material monomers, a perfluoroalkyl-containing oligomer, and an ionic compound.

It is preferable that in the re-peelable water dispersion type acryl-based pressure-sensitive adhesive composition of the present invention, the ionic compound contains a fluoroalkyl-containing anion.

It is preferable that in the re-peelable water dispersion type acryl-based pressure-sensitive adhesive composition of the present invention, the ionic compound contains an imide-containing anion.

It is preferable that in the re-peelable water dispersion type acryl-based pressure-sensitive adhesive composition of the present invention, the ionic compound is an ionic liquid and contains at least one kind cation selected from the group consisting of cations represented by the following formulas (A) to (E):

[Formula 1]

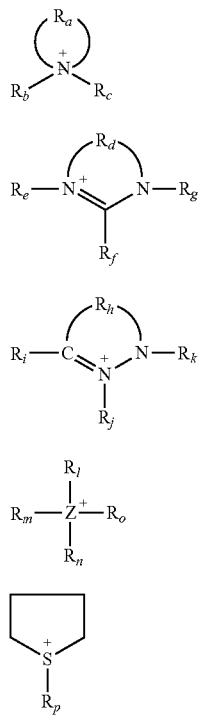

In the formula (A), $R_a$ represents a hydrocarbon group of a carbon number of 4 to 20, and may contain a hetero atom, and $R_b$ and $R_c$ are the same or different, represent hydrogen or a hydrocarbon group of a carbon number of 1 to 16, and may contain a hetero atom, provided that, when a nitrogen atom contains a double bond, $R_c$ is not present.

In the formula (B), $R_d$ represents a hydrocarbon group of a carbon number of 2 to 20, and may contain a hetero atom, and $R_e$, $R_f$ and $R_g$ are the same or different, represent hydrogen or a hydrocarbon group of a carbon number of 1 to 16, and may contain a hetero atom.

In the formula (C), $R_h$ represents a hydrocarbon group of a carbon number of 2 to 20, and may contain a hetero atom, and $R_i$, $R_j$ and $R_k$ are the same or different, represent a hydrogen or a hydrocarbon group of a carbon number of 1 to 16, and may contain a hetero atom.

In the formula (D), Z represents a nitrogen atom, a sulfur atom, or a phosphorus atom, and $R_l$, $R_m$, $R_n$ and $R_o$, are the same or different, represent a hydrocarbon group of a carbon number of 1 to 20, and may contain a hetero atom, provided that, when Z is a sulfur atom, $R_o$ is not present.

$R_p$ in the formula (E) represents a hydrocarbon group of 1 to 18 carbon atoms and may be a functional group in which a part of the hydrocarbon group is substituted with a hetero atom.

It is preferable that in the re-peelable water dispersion type acryl-based pressure-sensitive adhesive composition of the present invention, the cation of the ionic liquid is at least one kind cation selected from the group consisting of cations of imidazolium-containing salt type, pyridinium-containing salt type, morpholinium-containing salt type, pyrrolidinium-containing salt type, piperidinium-containing salt type, ammonium-containing salt type, phosphonium-containing salt type, and sulfonium-containing salt type.

It is preferable that in the re-peelable water dispersion type acryl-based pressure-sensitive adhesive composition of the present invention, the ionic liquid contains at least one kind cation selected from the group consisting of cations represented by the following formulas (a) to (d):

[Formula 2]

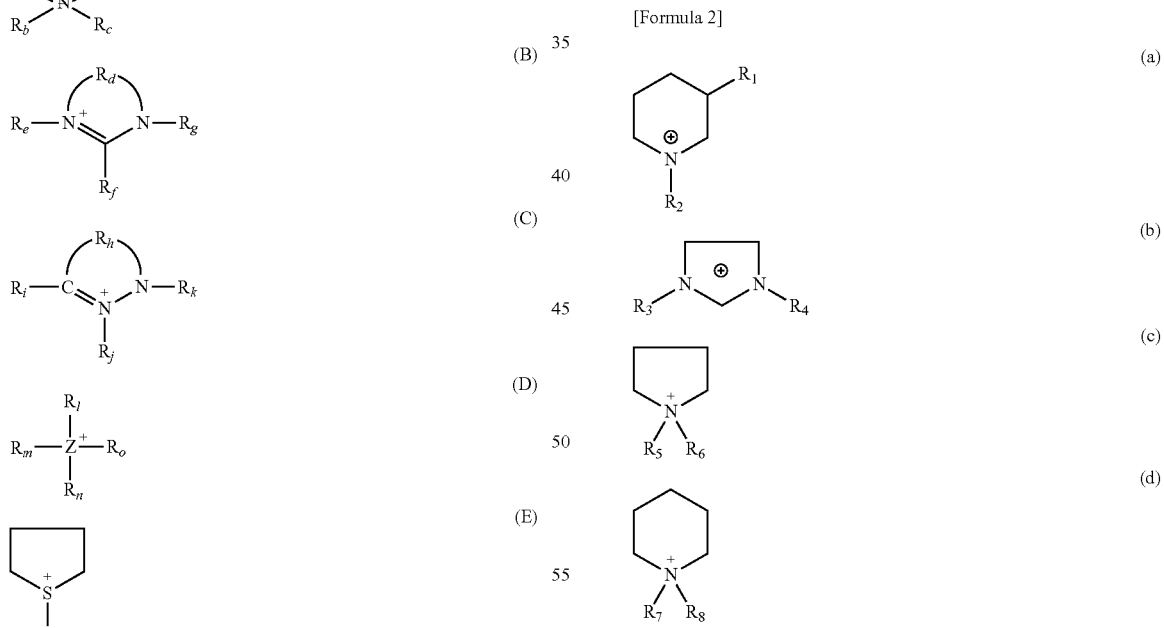

[in the formula (a), $R_1$ represents hydrogen or a hydrocarbon group with 1 to 3 carbon atoms; and $R_2$ represents hydrogen or a hydrocarbon group with 1 to 7 carbon atoms];

[in the formula (b), $R_3$ represents hydrogen or a hydrocarbon group with 1 to 3 carbon atoms; and $R_4$ represents hydrogen or a hydrocarbon group with 1 to 7 carbon atoms];

[in the formula (c), $R_5$ represents hydrogen or a hydrocarbon group with 1 to 3 carbon atoms; and $R_6$ represents hydrogen or a hydrocarbon group with 1 to 7 carbon atoms]; and

[in the formula (d), $R_7$ represents hydrogen or a hydrocarbon group with 1 to 3 carbon atoms; and $R_8$ represents hydrogen or a hydrocarbon group with 1 to 7 carbon atoms].

It is preferable that the re-peelable water dispersion type acryl-based pressure-sensitive adhesive composition of the present invention contains 0.5 to 3 parts by weight of the ionic compound per 100 parts by weight of the acrylic emulsion-based polymer (solid matter).

It is preferable that the re-peelable water dispersion type acryl-based pressure-sensitive adhesive composition of the present invention contains 0.5 to 3 parts by weight of the perfluoroalkyl-containing oligomer per 100 parts by weight of the acrylic emulsion-based polymer (solid matter).

It is preferable that in the re-peelable water dispersion type acryl-based pressure-sensitive adhesive composition of the present invention, the acrylic emulsion-based polymer is a polymer obtained by polymerization using a reactive emulsifier containing a radical polymerizable functional group in the molecule.

It is preferable that the re-peelable water dispersion type acryl-based pressure-sensitive adhesive composition of the present invention further contains a water-insoluble crosslinking agent having 2 or more functional groups which can be reacted with a carboxyl group in the molecule.

It is preferable that a pressure-sensitive adhesive sheet according to the present invention has a pressure-sensitive adhesive layer formed of the above-mentioned re-peelable water dispersion type acryl-based pressure-sensitive adhesive composition on at least one surface of a substrate.

It is preferable that the pressure-sensitive adhesive sheet of the present invention is a surface protecting film for an optical member.

A pressure-sensitive adhesive layer (pressure-sensitive adhesive sheet) formed of the water dispersion type acryl-based pressure-sensitive adhesive composition of the present invention has excellent antistatic properties, adherability, and re-peelable properties. Accordingly, the water dispersion type acryl-based pressure-sensitive adhesive composition of the prevent invention is useful for protecting the surface of an optical film.

BRIEF DESCRIPTION OF THE DRAWING

FIG. 1 is a schematic view of a potential measurement part.

DETAILED DESCRIPTION OF THE PREFERRED EMBODIMENTS

A re-peelable water dispersion type acryl-based pressure-sensitive adhesive composition according to the present invention (may be referred to as "pressure-sensitive adhesive composition") contains an acrylic emulsion-based polymer composed of a (meth)acrylic acid alkyl ester (i) and a carboxyl-containing unsaturated monomer (ii) as raw material monomers, a perfluoroalkyl-containing oligomer, and an ionic compound as indispensable components. Herein, in the pressure-sensitive adhesive composition of the present invention, "water dispersion type" refers to dispersible in an aqueous medium, that is, a pressure-sensitive adhesive composition dispersible in an aqueous medium. The aqueous medium is a medium (dispersant) containing water as an indispensable component and may be water alone or a mixture of water and a water-soluble organic solvent. The pressure-sensitive adhesive composition of the present invention may be a dispersion using the aqueous medium or the like.

[Acrylic Emulsion-Based Polymer]

The acrylic emulsion-based polymer is a polymer composed of a (meth)acrylic acid alkyl ester (i) and a carboxyl-containing unsaturated monomer (ii) as raw material monomers. The acrylic emulsion-based polymers may be used alone or in combination of two or more thereof. In the present invention, "(meth)acryl" refers to "acryl" and/or "methacryl".

The (meth)acrylic acid alkyl ester (i) is used as a main monomer component and plays a role as a pressure-sensitive adhesive (or pressure-sensitive adhesive layer) for exhibiting mainly basic characteristics such as tackiness and a peeling properties. Particularly, an acrylic acid alkyl ester tends to give flexibility to a polymer which forms a pressure-sensitive adhesive layer and to exert an effect of allowing the pressure-sensitive adhesive layer to exhibit adhesion and adherability, and a methacrylic acid alkyl ester tends to give hardness to a polymer which forms a pressure-sensitive adhesive layer and to exert an effect of adjusting the re-peelable properties of the pressure-sensitive adhesive layer. Examples of the (meth)acrylic acid alkyl ester (i) include, but are not particularly limited to, (meth)acrylic acid alkyl esters having a straight chain, branched chain, or cyclic alkyl group with 2 to 16 (more preferably 2 to 10 and furthermore preferably 4 to 8) carbon atoms, and the like.

Among them, the acrylic acid alkyl ester is preferably, for example, an acrylic acid alkyl ester having an alkyl group with 2 to 14 (more preferably 4 to 9) carbon atoms, and examples thereof include acrylic acid alkyl esters having a straight chain or branched chain alkyl group such as n-butyl acrylate, isobutyl acrylate, sec-butyl acrylate, isoamyl acrylate, hexyl acrylate, heptyl acrylate, octyl acrylate, 2-ethylhexyl acrylate, isooctyl acrylate, nonyl acrylate, and isononyl acrylate; and the like. Particularly, 2-ethylhexyl acrylate is preferable.

The methacrylic acid alkyl ester is preferably, for example, a methacrylic acid alkyl ester having an alkyl group with 2 to 16 (more preferably 2 to 10) carbon atoms, and examples thereof include methacrylic acid alkyl esters having a straight chain or branched chain alkyl group such as ethyl methacrylate, propyl methacrylate, isopropyl methacrylate, n-butyl methacrylate, isobutyl methacrylate, sec-butyl methacrylate, and tert-butyl methacrylate; alicyclic methacrylic acid alkyl esters such as cyclohexyl methacrylate, bornyl methacrylate, and isobornyl methacrylate; and the like.

The (meth)acrylic acid alkyl esters (i) may be selected properly in accordance with adherability of interest and the like, and used alone or in combination of two or more thereof.

The content of the (meth)acrylic acid alkyl ester (i) is preferably 70 to 99.5% by weight, more preferably 85 to 98% by weight, and furthermore preferably 87 to 96% by weight in total amount (100% by weight) of the raw material monomers (entire raw material monomers) constituting the acrylic emulsion-based polymer of the present invention. If the content is 70% by weight or more, the tackiness and re-peelable properties of the pressure-sensitive adhesive layer are improved and therefore, it is preferable. On the other hand, if the content exceeds 99.5% by weight, the content of the carboxyl-containing unsaturated monomer (ii) is decreased so that the appearance of the pressure-sensitive adhesive layer formed of the pressure-sensitive adhesive composition may be worsened. In the case where two or more kind (meth)acrylic acid alkyl esters (i) are used, the total amount (sum) of all the (meth)acrylic acid alkyl esters (i) should be within the above-mentioned range.

The carboxyl-containing unsaturated monomer (ii) exerts a function of forming a protecting layer on the surfaces of emulsion particles composed of the acrylic emulsion-based polymer of the present invention to prevent shear fracture of the particles. The effect can be improved further by neutralizing the carboxyl group with a base. The stability against the shear fracture of the particles is more generally referred to as a mechanical stability. Use of one or more kinds of the present water-insoluble crosslinking agents in combination, which react with a carboxyl group, can provide crosslinking points at the stage of forming a pressure-sensitive adhesive layer by water removal. Further, the adhesion (anchoring properties) to a substrate can be improved through the water-insoluble crosslinking agent. Examples of the carboxyl-containing unsaturated monomer (ii) include (meth)acrylic acids (acrylic acid and methacrylic acid), itaconic acid, maleic acid, fumaric acid, crotonic acid, carboxyethyl acrylate, carboxypentyl acrylate, and the like. The carboxyl-containing unsaturated monomer (ii) may also include acid anhydride group-containing unsaturated monomers such as maleic anhydride and itaconic anhydride. Among them, acrylic acid is preferable since acrylic acid exists in a relatively high concentration on the surfaces of the particles and easily forms a protecting layer with a higher density.

The content of the carboxyl-containing unsaturated monomer (ii) is preferably 0.5 to 10% by weight, more preferably 1 to 5% by weight, and furthermore preferably 2 to 4% by weight in total amount (100% by weight) of the raw material monomers (entire raw material monomers) constituting the acrylic emulsion-based polymer of the present invention. Adjustment of the content to 10% by weight or lower can suppress, after formation of the pressure-sensitive adhesive layer, an increase in interaction of the pressure-sensitive adhesive layer with a functional group existing on the surface of an adherend (an object to be protected) such as a polarizing plate to suppress an increase in peeling power (adhesive power) with the lapse of time, and thus to improve the peeling properties and therefore, it is preferable. If the content exceeds 10% by weight, since the carboxyl-containing unsaturated monomer (ii) (e.g., acrylic acid) is generally water-soluble, it may possibly be polymerized in water to cause an increase in viscosity (viscosity increasing). Further, if a large number of carboxyl groups exist in the skeleton of the acrylic emulsion-based polymer, it is supposed that the pressure-sensitive adhesive layer interacts with an ionic compound blended as an antistatic agent to hinder ion conductivity, and no antistatic function to an adherend can be obtained and therefore, it is not preferable. On the other hand, adjustment of the content to 0.5% by weight or more improves the mechanical stability of the emulsion particles and therefore, it is preferable. The adhesion (anchoring properties) between the pressure-sensitive adhesive layer and the substrate can be improved to suppress the adhesive residue and therefore, it is preferable.

For the purpose of providing a specified function, the raw material monomers constituting the acrylic emulsion-based polymer of the present invention may include other monomer components in combination other than the above indispensable components [(meth)acrylic acid alkyl ester (i) and carboxyl-containing unsaturated monomer (ii)]. For example, for the purpose of decreasing appearance defects, methyl methacrylate, vinyl acetate, diethylacrylamide, and the like can be used as the monomer components. In the case of using these monomers, the stability of the emulsion particles is increased, gelling matters (agglomerates) can be decreased, the affinity with a hydrophobic water-insoluble crosslinking agent is increased, dispersibility of the emulsion particles is improved, and dents in the pressure-sensitive adhesive layer due to defective dispersion can be decreased. For the purpose of improving crosslinking among the emulsion particles and cohesive strength, epoxy group-containing monomers such as glycidyl (meth)acrylate and polyfunctional monomers such as trimethylolpropane tri(meth)acrylate and divinylbenzene are also usable. It is preferable to blend (add) these monomers at a ratio of less than 5% by weight, respectively. The blend amount (use amount) is a content in total amount (100% by weight) of the raw material monomers (entire raw material monomers) constituting the acrylic emulsion-based polymer of the present invention.

It is preferable that the blend amount (use amount) of a hydroxyl-containing unsaturated monomer, as the other monomer components, such as 2-hydroxyethyl acrylate and 2-hydroxypropyl acrylate is small from the viewpoint of a decrease in whitening pollution. Practically, the blend amount of the hydroxyl-containing unsaturated monomer (the content in total amount (100% by weight) of the raw material monomers (entire raw material monomers) constituting the acrylic emulsion-based polymer of the present invention) is preferably lower than 1% by weight, more preferably lower than 0.1% by weight, and furthermore preferably substantially null (e.g., lower than 0.05% by weight). However, in the case where crosslinking points for crosslinking of a hydroxyl group and an isocyanato group, metal crosslinking, and the like are intended to be introduced, the monomer may be added (used) in an amount of about 0.01 to 10% by weight.

The acrylic emulsion-based polymer of the present invention can be obtained by the emulsion polymerization of the raw material monomers (monomer mixture) with an emulsifier or a polymerization initiator.

It is preferable to use reactive emulsifiers having radical polymerizable functional groups introduced into the molecules (reactive emulsifiers including radical polymerizable functional groups) as the emulsifier to be used for the emulsion polymerization of the acrylic emulsion-based polymer of the present invention. These emulsifiers may be used alone or in combination of two or more thereof.

[Reactive Emulsifier]

The reactive emulsifier having a radical polymerizable functional group (hereinafter, referred to as "reactive emulsifier") is an emulsifier having at least one radical polymerizable functional group in the molecule (one molecule). The reactive emulsifier is not particularly limited, and one or more kinds of various reactive emulsifiers having radical polymerizable functional groups such as a vinyl group, a propenyl group, an isopropenyl group, a vinyl ether group (vinyloxy group), and an allyl ether group (allyloxy group) may be selected and used. Use of the reactive emulsifier allows the emulsifier to be incorporated into the polymer, and contamination derived from the emulsifier is reduced and therefore, it is preferable.

Examples of the reactive emulsifier include reactive emulsifiers having a configuration (or equivalent configuration) formed by introducing a radical polymerizable functional group (radical reactive group) such as a propenyl group or an allyl ether group into a nonionic anionic emulsifier (anionic emulsifier having a nonionic hydrophilic group) such as sodium polyoxyethylene alkyl ether sulfate, polyoxyethylene alkylphenyl ether ammonium sulfate, sodium polyoxyethylene alkylphenyl ether sulfate, and sodium polyoxyethylene alkylsulfosuccinate. Hereinafter, a reactive emulsifier having a configuration formed by introducing a radical polymerizable functional group into an anionic emulsifier will be referred to as "anionic reactive emulsifier". A reactive emulsifier having a configuration formed by introducing a radical polymerizable functional group into a nonionic anionic emulsifier will be referred to as "nonionic anionic reactive emulsifier".

In the case where an anionic reactive emulsifier (especially, nonionic anionic reactive emulsifier) is particularly used, the low contamination properties can be improved since the emulsifier is incorporated into the polymer. Further, in the case where the water-insoluble crosslinking agent of the present invention is a polyfunctional epoxy-based crosslinking agent having an epoxy group, the reactivity of the crosslinking agent can be improved due to its catalytic function. In the case where an anionic reactive emulsifier is not used, the crosslinking reaction is not finished through aging, and it may result in a problem such that the peeling power (adhesive power) of the pressure-sensitive adhesive layer changes with the lapse of time. Further, since the anionic reactive emulsifier is incorporated into the polymer, unlike a quaternary ammonium compound which is used generally as a catalyst for an epoxy-based crosslinking agent (e.g., see JP-A 2007-031585), the anionic reactive emulsifier is not deposited on the surface of an adherend, the emulsifier cannot be a cause of whitening pollution and therefore, it is preferable.

It is possible to use, as the anionic reactive emulsifier, commercialized products such as trade name "Adeka Reasoap SE-10N" (manufactured by ADEKA CORPORATION), trade name "Aqualon HS-10" (manufactured by DAI-ICHI KOGYO SEIYAKU CO., LTD.), trade name "Aqualon HS-05" (manufactured by DAI-ICHI KOGYO SEIYAKU CO., LTD.), and trade name "Aqualon HS-1025" (manufactured by DAI-ICHI KOGYO SEIYAKU CO., LTD.).

Particularly, since impurity ions may be problematic, it is desirable to use an emulsifier from which impurity ions are removed and which has a $SO_4^{2-}$ ion concentration of 100 μg/g or lower. In the case of an anionic emulsifier, it is desirable to use an ammonium salt emulsifier. As a method for removing impurities from an emulsifier, proper methods such as an ion exchange resin method, a membrane separation method, an impurity precipitation filtration method using an alcohol, and the like may be used.

The blend amount (use amount) of the reactive emulsifier is preferably 0.1 to 10 parts by weight, more preferably lower than 0.5 to 6 parts by weight, and furthermore preferably 1 to 4.5 parts by weight per 100 parts by weight of total amount of the raw material monomers (entire raw material monomers) constituting the acrylic emulsion-based polymer of the present invention. Adjustment of the blend amount to 0.1 parts by weight or more makes it possible to maintain stable emulsification and therefore, it is preferable. On the other hand, adjustment of the blend amount to 10 parts by weight or lower makes it possible to improve the cohesive strength of the pressure-sensitive adhesive (pressure-sensitive adhesive layer), to suppress contamination of an adherend, and to suppress pollution with the emulsifier and therefore, it is preferable.

[Polymerization Initiator]

A polymerization initiator to be used for emulsion polymerization of the acrylic emulsion-based polymer of the present invention is not particularly limited, and examples thereof include azo-based polymerization initiators such as 2,2'-azobisisobutyronitrile, 2,2'-azobis(2-amidinopropane) dihydrochloride, 2,2'-azobis[2-(5-methyl-2-imidazolin-2-yl)propane]dihydrochloride, 2,2'-azobis(2-methylpropionamidine) disulfate, and 2,2'-azobis(N,N'-dimethyleneisobutylamidine); persulfuric acid salts such as potassium persulfate and ammonium persulfate; peroxide-based polymerization initiators such as benzoyl peroxide, tert-butyl hydroperoxide, and hydrogen peroxide; redox-based polymerization initiators obtained by using peroxides and reducing agents in combination such as a combination of a peroxide and ascorbic acid (combination of hydrogen peroxide and ascorbic acid, etc.), a combination of a peroxide and a ferrous salt (combination of hydrogen peroxide and a ferrous salt), and a combination of a persulfate and sodium hydrogen sulfite.

The blend amount (use amount) of the polymerization initiator is not particularly limited and can be properly determined depending the kinds of an initiator and raw material monomers, but is preferably 0.01 to 1 part by weight and more preferably 0.02 to 0.5 parts by weight per 100 parts by weight of total amount of the raw material monomers (entire raw material monomers) constituting the acrylic emulsion-based polymer of the present invention.

The emulsion polymerization of the acrylic emulsion-based polymer of the present invention is carried out by emulsifying monomer components in water by a conventional method and thereafter carrying out emulsion polymerization. Accordingly, a water dispersion (polymer emulsion) containing the acrylic emulsion-based polymer as a base polymer can be prepared. A method for the emulsion polymerization is not particularly limited, and examples thereof include known emulsion polymerization methods such as a batch loading method (batch polymerization method), a monomer dropping method, and a monomer emulsion dropping method. In the monomer dropping method and the monomer emulsion dropping method, continuous dropping or separate dropping is selected properly. These methods may be properly employed in combination. The reaction conditions or the like may be selected properly, but the polymerization temperature is, for example, preferably about 40 to 95° C. and the polymerization time is preferably about 30 minutes to 24 hours.

A solvent-insoluble matter (the ratio of solvent-insoluble components, may be referred to as "gelation ratio") of the acrylic emulsion-based polymer of the present invention is preferably 70% (% by weight) or more, more preferably 75% by weight or more, and furthermore preferably 80% by weight or more from the viewpoint of low contamination properties and a proper peeling power (adhesive power). If the solvent-insoluble matter is less than 70% by weight, since a large quantity of monomer is contained in the acrylic emulsion-based polymer and the low molecular weight components in the pressure-sensitive adhesive layer cannot be reduced merely by crosslinking effect, the adherend contamination derived from the low molecular weight components may be caused or the peeling power (adhesive power) may become too high. The solvent-insoluble matter may be controlled based on the polymerization initiator, reaction temperature, kinds of the emulsifier and raw material monomers. The upper limit of the solvent-insoluble matter is not particularly limited, but it is, for example, 99% by weight. In the present invention, the solvent-insoluble matter of the acrylic emulsion-based polymer is a value calculated by the following "measurement method for solvent-insoluble matter".

[Measurement Method for Solvent-Insoluble Matter]

After about 0.1 g of an acrylic emulsion-based polymer is sampled and wrapped with a porous tetrafluoroethylene sheet with an average pore diameter of 0.2 μm (trade name: "NTF1122", manufactured by NITTO DENKO CORPORATION), the wrapped body was tied with a kite string and the weight thereof is measured as a weight before immersion. The weight before immersion is the total weight of the acrylic emulsion-based polymer (sampled in the above), the tetrafluoroethylene sheet, and the kite string. The total weight of the tetrafluoroethylene sheet and the kite string is also measured as a wrapping weight.

Next, the acrylic emulsion-based polymer wrapped with the tetrafluoroethylene sheet and tied with the kite string (referred to as "sample") is put in a 50 ml container filled with ethyl acetate and allowed to stand still at 23° C. for 7 days. Thereafter (after ethyl acetate treatment), the sample is taken out of the container and transferred to an aluminum cup and dried at 130° C. for 2 hours in a drier to remove ethyl acetate. Successively, the weight is measured as a weight after immersion. The solvent-insoluble matter is calculated according to the following equation:

$$\text{Solvent-insoluble matter (\% by weight)} = (a-b)/(c-b) \times 100 \quad (1)$$

wherein, a is weight after immersion; b is wrapping weight; and c is weight before immersion.

The weight average molecular weight (Mw) of a solvent-soluble matter (may be referred to as "sol matter") in the acrylic emulsion-based polymer of the present invention is preferably 40000 to 200000, more preferably 50000 to 150000, and furthermore preferably 60000 to 100000. If the weight average molecular weight of the solvent-soluble matter in the acrylic emulsion-based polymer is 40000 or more, the wettability of the pressure-sensitive adhesive composition to an adherend is improved and the tackiness to the adherend is improved. If the weight average molecular weight of the solvent-soluble matter in the acrylic emulsion-based polymer is 200000 or lower, the remaining amount of the pressure-sensitive adhesive composition on an adherend is decreased and the low contamination properties for the adherend is improved. The weight average molecular weight of the solvent-soluble matter in the acrylic emulsion-based polymer can be measured by subjecting a sample (solvent-soluble matter of the acrylic emulsion-based polymer) obtained by air blow drying, under normal temperature, of the treated solution (ethyl acetate solution) after the ethyl acetate treatment, the solution being obtained in the measurement of the solvent-insoluble matter of the acrylic emulsion-based polymer, to GPC (gel permeation chromatography). Examples of the practical measurement method include the following methods.

[Measurement Method for Weight Average Molecular Weight]

The GPC measurement is carried out using a GPC apparatus "HLC-8220 GPC" manufactured by TOSOH CORPORATION and the molecular weight is measured in terms of polystyrene. The measurement conditions are as follows.

Sample concentration: 0.2% by weight (THF solution)
Sample injection amount: 10 μl
Eluent: THF
Flow speed: 0.6 ml/minute
Measurement temperature: 40° C.
Column:
Sample column: one TSK guard column Super HZ-H+two TSK gel Super HZM-H
Reference column: one TSK gel Super H-RC
Detector: differential refractometer The re-peelable water dispersion type acryl-based pressure-sensitive adhesive composition of the present invention contains a perfluoroalkyl-containing oligomer as an indispensable component. Inclusion of the perfluoroalkyl-containing oligomer makes it possible to give peeling antistatic properties and improve the adhesive power and therefore, it is a preferable embodiment.

Any of the perfluoroalkyl-containing oligomer can be used without particular limitation and for example, commercialized products such as trade name "Megafac F-477" (manufactured by DIC Corporation) and trade name "Surflon S-386" (manufactured by AGC SEIMI CHEMICAL CO., LTD.) can be used. Use thereof makes it possible to improve peeling antistatic properties and adhesive power and therefore, the oligomer is useful.

The blend amount of the perfluoroalkyl-containing oligomer is preferably 0.5 to 3 parts by weight, more preferably 0.6 to 2.5 parts by weight, and furthermore preferably 0.7 to 2.0 parts by weight per 100 parts by weight of the acrylic emulsion-based polymer (solid matter). If it is less than 0.5 parts by weight, it is not possible to simultaneously attain both the peeling antistatic properties and the adhesive power, and if it exceeds 3.0 parts by weight, the adhesive power is lowered and an adherend is contaminated and therefore, it is not preferable.

[Water-Insoluble Crosslinking Agent]

In the present invention, a crosslinking agent may be blended and preferably, it is a water-insoluble compound, which is a crosslinking agent (water-insoluble crosslinking agent) having 2 or more functional groups (e.g., 2 to 6) which can be reacted with a carboxyl group in the molecule (in one molecule), and more preferably the number of the functional groups which can be reacted with a carboxyl group in one molecule is 3 to 5. As the number of the functional groups which can be reacted with a carboxyl group in one molecule is higher, the pressure-sensitive adhesive composition is more densely crosslinked (that is, the crosslinked structure of a polymer constituting the pressure-sensitive adhesive layer becomes dense). Therefore, the wet spreading of the pressure-sensitive adhesive layer after the formation of the pressure-sensitive adhesive layer can be prevented. Further, the polymer forming the pressure-sensitive adhesive layer is bounded so that the functional groups (carboxyl groups) in the pressure-sensitive adhesive layer exist unevenly on the adherend surface, and thus an increase in peeling power (adhesive power) between the pressure-sensitive adhesive layer and the adherend with the lapse of time can be prevented. On the other hand, in the case where the number of the functional groups which can be reacted with a carboxyl group in one molecule is too high beyond 6, a gelling product may be formed.

Examples of the functional group of the water-insoluble crosslinking agent which can be reacted with a carboxyl group include, but are not particularly limited to, an epoxy group, an isocyanato group, a carbodiimide group, and the like. Among them, from the viewpoint of reactivity, an epoxy group is preferable. Further, from the viewpoint of advantages in less remaining of unreacted products and low contamination at the time of crosslinking reaction owing to high reactivity and from the viewpoint of capability of preventing an increase in peeling power (adhesive power) with the lapse of time between an adherend and the pressure-sensitive adhesive layer owing to an unreacted carboxyl group in the pressure-sensitive adhesive layer, a glycidylamino group is preferable. That is, as the water-insoluble crosslinking agent of the present invention, an epoxy-based crosslinking agent with epoxy group is preferable and particularly, a crosslinking agent with glycidylamino group (glycidylamino-based crosslinking agent) is preferable. In the case where the water-insoluble crosslinking agent of the present invention is an epoxy-based crosslinking agent (particularly, glycidylamino-based crosslinking agent), the number of epoxy (particularly, glycidylamino) group in one molecule is 2 or more (e.g., 2 to 6) and preferably 3 to 5.

The water-insoluble crosslinking agent is a water-insoluble compound. Herein, "water-insoluble" refers to the solubility of 5 parts by weight or lower, preferably 3 parts by weight or lower, and more preferably 2 parts by weight or lower at 25° C. in 100 parts by weight of water. Use of a water-insoluble crosslinking agent improves the low contamination properties since the crosslinking agent remaining without crosslinking hardly causes whitening pollution to be generated on an adherend under highly humid environments. In the case of a water-soluble crosslinking agent, the remaining crosslinking agent is dissolved in water and tends to be transferred easily to an adherend under highly humid environments and therefore, it easily causes whitening pollution. Further, as compared with a water-soluble crosslinking agent, a water-insoluble crosslinking agent highly contributes to crosslinking reaction (reaction with carboxyl group) and highly effectively prevents an increase in peeling power (adhesive power) with the lapse of time. Further, due to high reactivity to crosslinking reaction, a water-insoluble crosslinking agent quickly promotes crosslinking reaction by aging and thus prevents an increase in peeling power (pressure-sensitive adhesive power) with the lapse of time between an adherend and the pressure-sensitive adhesive layer owing to an unreacted carboxyl group in the pressure-sensitive adhesive layer. In the case where the blend amount of the crosslinking agent is high, the peeling itself may becomes difficult and it is not preferable. The solubility of the crosslinking agent in water can be measured, for example, as follows.

[Measurement Method for Solubility in Water]

Water (25° C.) and a crosslinking agent in the same weight are mixed by a stirrer at a rotation rate of 300 rpm for 10 minutes and a water phase and an oil phase are separated by centrifugal separation. Next, the water phase is sampled and dried at 120° C. for 1 hour, and the non-volatile matter in the water phase is measured based on the drying weight loss (parts by weight of non-volatile matter per 100 parts by weight of water).

Practically, examples of the water-insoluble crosslinking agent of the present invention include glycidylamino-based crosslinking agents such as 1,3-bis(N,N-diglycidylaminomethyl)cyclohexane (e.g., trade name "TETRAD-C" etc., manufactured by MITSUBISHI GAS CHEMICAL COMPANY, INC.) [solubility of 2 parts by weight or lower in 100 parts by weight of water at 25° C.] and 1,3-bis(N,N-diglycidylaminomethyl)benzene (trade name "TETRAD-X" etc., manufactured by MITSUBISHI GAS CHEMICAL COMPANY, INC.) [solubility of 2 parts by weight or lower in 100 parts by weight of water at 25° C.]; other epoxy-based crosslinking agents such as Tris(2,3-epoxypropyl)isocyanurate (e.g., trade name: "TEPIC-G", manufactured by NISSAN CHEMICAL INDUSTRIES, LTD.) [solubility of 2 parts by weight or lower in 100 parts by weight of water at 25° C.]; and the like.

The blend amount of the water-insoluble crosslinking agent of the present invention (content thereof in the pressure-sensitive adhesive composition of the present invention) is preferably adjusted such that the number of moles of the functional group of the water-insoluble crosslinking agent of the present invention which can be reacted with a carboxyl group, is 0.3 to 1.3 mol per 1 mol of the carboxyl group of the carboxyl-containing unsaturated monomer (ii) used as a raw material monomer for the acrylic emulsion-based polymer of the present invention. That is, the ratio [functional group which can be reacted with carboxyl group/carboxyl group] (mole ratio) of "total number of moles of functional group of water-insoluble crosslinking agent of present invention which can be reacted with carboxyl group" to "total number of carboxyl groups of carboxyl-containing unsaturated monomer (ii) used as raw material monomer for acrylic emulsion-based polymer of present invention" is preferably 0.3 to 1.3, more preferably 0.3 to 1.1, and furthermore preferably 0.3 to 1.0. Adjustment of the [functional group which can be reacted with carboxyl group/carboxyl] to 0.3 or higher makes it possible to decrease unreacted carboxyl groups in the pressure-sensitive adhesive layer and to prevent an increase in peeling power (adhesive power) with the lapse of time attributed to the interaction between a carboxyl group and an adherend and therefore, it is preferable. Further, adjustment thereof to 1.3 or lower makes it possible to decrease the unreacted water-insoluble crosslinking agent in the pressure-sensitive adhesive layer, to suppress appearance deterioration due to the water-insoluble crosslinking agent, and to improve the appearance characteristics and therefore, it is preferable.

Particularly, in the case where the water-insoluble crosslinking agent of the present invention is an epoxy-based crosslinking agent, [epoxy group/carboxyl group] (mole ratio) is preferably 0.3 to 1.3, more preferably 0.3 to 1.1, and furthermore preferably 0.3 to 1.0. In the case where the water-insoluble crosslinking agent of the present invention is a glycidylamino-based crosslinking agent, [glycidylamino group/carboxyl group] (mole ratio) preferably satisfies the above-mentioned range.

For example, in the case where 4 g of a water-insoluble crosslinking agent with a functional group equivalent of 110 (g/eq) of the functional group which can be reacted with a carboxyl group is added (blended) in the pressure-sensitive adhesive composition, the number of moles of the functional group of the water-insoluble crosslinking agent which can be reacted with a carboxyl group can be calculated as follows.

Number of moles of functional group of water-insoluble crosslinking agent which can be reacted with carboxyl group=[blend amount (blend amount) of water-insoluble crosslinking agent]/[functional group equivalent]=4/110.

For example, in the case where 4 g of an epoxy-based crosslinking agent with an epoxy equivalent of 110 (g/eq) is added (blended) as a water-insoluble crosslinking agent, the number of moles of an epoxy group of the epoxy-based crosslinking agent is calculated, for example, as follows.

Number of moles of epoxy group of epoxy-based crosslinking agent=[blend amount (blend amount) of epoxy-based crosslinking agent]/[epoxy equivalent]=4/110.

[Ionic Compound]

The re-peelable water dispersion type acryl-based pressure-sensitive adhesive composition of the present invention contains an ionic compound as an indispensable component. As the ionic compound, any ionic compound can be used without limitation as long as the compound can provide antistatic properties, and more preferable examples thereof include ionic liquids, alkali metal salts and the like. Addition of these ionic compounds gives excellent antistatic properties.

[Ionic Liquid]

An ionic liquid in the present invention refers to a molten salt (ionic compound) in a liquid state at 25° C. and it is not particularly limited, but those which are composed of an organic cationic component represented by the following formulas (A) to (E) and an anionic component are preferably used due to the reason that excellent antistatic capability can be obtained.

[Formula 3]

(A) 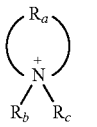

(B) 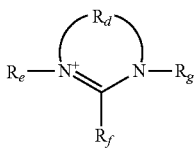

(C) 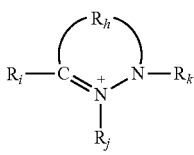

(D) 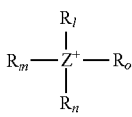

(E) 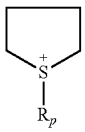

In the formula (A), $R_a$ represents a hydrocarbon group of a carbon number of 4 to 20, and may contain a hetero atom, and $R_b$ and $R_c$ are the same or different, represent hydrogen or a hydrocarbon group of a carbon number of 1 to 16, and may contain a hetero atom, provided that, when a nitrogen atom contains a double bond, $R_c$ is not present.

In the formula (B), $R_d$ represents a hydrocarbon group of a carbon number of 2 to 20, and may contain a hetero atom, and $R_e$, $R_f$ and $R_g$ are the same or different, represent hydrogen or a hydrocarbon group of a carbon number of 1 to 16, and may contain a hetero atom.

In the formula (C), $R_h$ represents a hydrocarbon group of a carbon number of 2 to 20, and may contain a hetero atom, and $R_i$, $R_j$ and $R_k$ are the same or different, represent a hydrogen or a hydrocarbon group of a carbon number of 1 to 16, and may contain a hetero atom.

In the formula (D), Z represents a nitrogen atom, a sulfur atom, or a phosphorus atom, and $R_l$, $R_m$, $R_n$ and $R_o$ are the same or different, represent a hydrocarbon group of a carbon number of 1 to 20, and may contain a hetero atom, provided that, when Z is a sulfur atom, $R_o$ is not present.

$R_p$ in the formula (E) represents a hydrocarbon group of 1 to 18 carbon atoms and may be a functional group in which a part of the hydrocarbon group is substituted with a hetero atom.

Examples of the cation represented by the formula (A) include a pyridinium cation, a piperidinium cation, a pyrrolidinium cation, a cation having a pyrroline skeleton, a cation having a pyrrole skeleton, and a morpholinium cation.

Specific examples thereof include 1-ethylpyridinium cation, 1-butylpyridinium cation, 1-hexylpyridinium cation, 1-butyl-3-methylpyridinium cation, 1-butyl-4-methylpyridinium cation, 1-hexyl-3-methylpyridinium cation, 1-butyl-3,4-dimethylpyridinium cation, 1-ethyl-3-hydroxymethylpyridinium cation, 1,1-dimethylpyrrolidinium cation, 1-ethyl-1-methylpyrrolidinium cation, 1-methyl-1-propylpyrrolidinium cation, 1-methyl-1-butylpyrrolidinium cation, 1-methyl-1-pentylpyrrolidinium cation, 1-methyl-1-hexylpyrrolidinium cation, 1-methyl-1-heptylpyrrolidinium cation, 1-ethyl-1-propylpyrrolidinium cation, 1-ethyl-1-butylpyrrolidinium cation, 1-ethyl-1-pentylpyrrolidinium cation, 1-ethyl-1-hexylpyrrolidinium cation, 1-ethyl-1-heptylpyrrolidinium cation, 1,1-dipropylpyrrolidinium cation, 1-propyl-1-butylpyrrolidinium cation, 1,1-dibutylpyrrolidinium cation, 1-propylpiperidinium cation, 1-pentylpiperidinium cation, 1,1-dimethylpiperidinium cation, 1-methyl-1-ethylpiperidinium cation, 1-methyl-1-propylpiperidinium cation, 1-methyl-1-butylpiperidinium cation, 1-methyl-1-pentylpiperidinium cation, 1-methyl-1-hexylpiperidinium cation, 1-methyl-1-heptylpiperidinium cation, 1-ethyl-1-propylpiperidinium cation, 1-ethyl-1-butylpiperidinium cation, 1-ethyl-1-pentylpiperidinium cation, 1-ethyl-1-hexylpiperidinium cation, 1-ethyl-1-heptylpiperidinium cation, 1,1-dipropylpiperidinium cation, 1-propyl-1-butylpiperidinium cation, 1,1-dibutylpiperidinium cation, 2-methyl-1-pyrroline cation, 1-ethyl-2-phenylindole cation, 1,2-dimethylindole cation, 1-ethylcarbazole cation, and N-ethyl-N-methylmorpholinium cation.

Examples of the cation represented by the formula (B) include an imidazolium cation, a tetrahydropyrimidinium cation, and a dihydropyrimidinium cation.

Specific examples thereof include 1,3-dimethylimidazolium cation, 1,3-diethylimidazolium cation, 1-ethyl-3-methylimidazolium cation, 1-butyl-3-methylimidazolium cation, 1-hexyl-3-methylimidazolium cation, 1-octyl-3-methylimidazolium cation, 1-decyl-3-methylimidazolium cation, 1-dodecyl-3-methylimidazolium cation, 1-tetradecyl-3-methylimidazolium cation, 1,2-dimethyl-3-propylimidazolium cation, 1-ethyl-2,3-dimethylimidazolium cation, 1-butyl-2,3-dimethylimidazolium cation, 1-hexyl-2,3-dimethylimidazolium cation, 1-(2-hydroxyethyl)-3-methylimidazolium cation, 1-allyl-3-methylimidazolium cation, 1,3-dimethyl-1,4,5,6-tetrahydropyrimidinium cation, 1,2,3-trimethyl-1,4,5,6-tetrahydropyrimidinium cation, 1,2,3,4-tetramethyl-1,4,5,6-tetrahydropyrimidinium cation, 1,2,3,5-tetramethyl-1,4,5,6-tetrahydropyrimidinium cation, 1,3-dimethyl-1,4-dihydropyrimidinium cation, 1,3-dimethyl-1,6-dihydropyrimidinium cation, 1,2,3-trimethyl-1,4-dihydropyrimidinium cation, 1,2,3-trimethyl-1,6-dihydropyrimidinium cation, 1,2,3,4-tetramethyl-1,4-dihydropyrimidinium cation, 1,2,3,4-tetramethyl-1,6-dihydropyrimidinium cation, and the like.

Examples of the cation represented by the formula (C) include a pyrazolium cation, and a pyrazolinium cation.

Specific examples thereof include 1-methylpyrazolium cation, 3-methylpyrazolium cation, 1-ethyl-2-methylpyrazolium cation, 1-ethyl-2,3,5-trimethylpyrazolium cation, 1-propyl-2,3,5-trimethylpyrazolium cation, 1-butyl-2,3,5-trimethylpyrazolium cation, 1-ethyl-2,3,5-trimethylpyrazolinium cation, 1-propyl-2,3,5-trimethylpyrazolinium cation, 1-butyl-2,3,5-trimethylpyrazolinium cation, and the like.

Examples of the cation represented by the formula (D) include a tetraalkylammonium cation, a trialkylsulfonium cation, a tetraalkylphosphonium cation, and those cations in which a part of the alkyl group is substituted with an alkenyl group, an alkoxyl group, or an epoxy group.

Specific examples thereof include tetramethylammonium cation, tetraethylammonium cation, tetrabutylammonium cation, tetrapentylammonium cation, tetrahexylammonium cation, tetraheptylammonium cation, triethylmethylammonium cation, tributylethylammonium cation, trimethyldecylammonium cation, N, N-diethyl-N-methyl-N-(2-methoxyethyl) ammonium cation, glycidyltrimethylammonium cation, trimethylsulfonium cation, triethylsulfonium cation, tributylsulfonium cation, trihexylsulfonium cation, diethylmethylsulfonium cation, dibutylethylsulfonium cation, dimethyldecylsulfonium cation, tetramethylphosphonium cation, tetraethylphosphonium cation, tetrabutylphosphonium cation, tetrahexylphosphonium cation, tetraoctylphosphonium cation, triethylmethylphosphonium cation, tributylethylphosphonium cation, trimethyldecylphosphonium cation, diallyldimethylammonium cation, and the like. Among them, preferably used are asymmetric tetraalkylammonium cation, trialkylsulfonium cation, and tetraalkylphosphonium cation such as triethylmethylammonium cation, tributylethylammonium cation, trimethyldecylammonium cation, diethylmethylsulfonium cation, dibutylethylsulfonium cation, dimethyldecylsulfonium cation, triethylmethylphosphonium cation, tributylethylphosphonium cation, and trimethyldecylphosphonium cation, as well as N,N-diethyl-N-methyl-N-(2-methoxyethyl)ammonium cation, glycidyltrimethylammonium cation, diallyldimethylammonium cation, N,N-dimethyl-N-ethyl-N-propylammonium cation, N,N-dimethyl-N-ethyl-N-butylammonium cation, N,N-dimethyl-N-ethyl-N-pentylammonium cation, N,N-dimethyl-N-ethyl-N-hexylammonium cation, N,N-dimethyl-N-ethyl-N-heptylammonium cation, N,N-dimethyl-N-ethyl-N-nonylammonium cation, N,N-dimethyl-N,N-dipropylammonium cation, N,N-diethyl-N-propyl-N-butylammonium cation, N,N-dimethyl-N-propyl-N-pentylammonium cation, N,N-dimethyl-N-propyl-N-hexylammonium cation, N,N-dimethyl-N-propyl-N-heptylammonium cation, N,N-dimethyl-N-butyl-N-hexylammonium cation, N,N-diethyl-N-butyl-N-heptylammonium cation, N,N-dimethyl-N-pentyl-N-hexylammonium cation, N,N-dimethyl-N,N-dihexylammonium cation, trimethylheptylammonium cation, N,N-diethyl-N-methyl-N-propylammonium cation, N,N-diethyl-N-methyl-N-pentylammonium cation, N,N-diethyl-N-methyl-N-heptylammonium cation, N,N-diethyl-N-propyl-N-pentylammonium cation, triethylpropylammonium cation, triethylpentylammonium cation, triethylheptylammonium cation, N,N-dipropyl-N-methyl-N-ethylammonium cation, N,N-dipropyl-N-methyl-N-pentylammonium cation, N,N-dipropyl-N-butyl-N-hexylammonium cation, N,N-dipropyl-N,N-dihexylammonium cation, N,N-dibutyl-N-methyl-N-pentylammonium cation, N,N-dibutyl-N-methyl-N-hexylammonium cation, trioctylmethylammonium cation, and N-methyl-N-ethyl-N-propyl-N-pentylammonium cation, and choline cation.

The cation represented by the formula (E) includes, for example, a sulfonium cation. Specific examples of Rp in the formula (E) include a methyl group, an ethyl group, a propyl group, a butyl group, a hexyl group, an octyl group, a nonyl group, a decyl group, a dodecyl group, a tridecyl group, a tetradecyl group, an octadecyl group and the like.

It is preferable that in the water dispersion type acryl-based pressure-sensitive adhesive composition of the present invention, the cation of the ionic liquid is at least one kind cation selected from the group consisting of imidazolium-containing salt type, pyridinium-containing salt type, morpholinium-containing salt type, pyrrolidinium-containing salt type, piperidinium-containing salt type, ammonium-containing salt type, phosphonium-containing salt type, and sulfonium-containing salt type. The ionic liquid falls under those containing cations represented by the above formulas (A), (B), and (D).

It is preferable that in the water dispersion type acryl-based pressure-sensitive adhesive composition of the present invention, the ionic liquid contains at least one kind cation selected from the group consisting of cations represented by the following formulas (a) to (d). These cations are those represented by the above formulas (A) and (B):

[Formula 4]

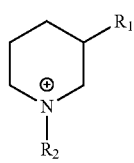

(a)

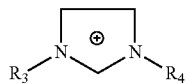

(b)

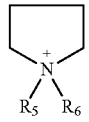

(c)

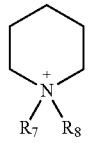

(d)

In the formula (a), $R_1$ represents hydrogen or a hydrocarbon group with 1 to 3 carbon atoms, preferably hydrogen or a hydrocarbon group with 1 carbon atom; and $R_2$ represents hydrogen or a hydrocarbon group with 1 to 7 carbon atoms, preferably a hydrocarbon group with 1 to 6 carbon atoms, and more preferably a hydrocarbon group with 1 to 4 carbon atoms.

In the formula (b), $R_3$ represents hydrogen or a hydrocarbon group with 1 to 3 carbon atoms, preferably hydrogen or a hydrocarbon group with 1 carbon atom; and $R_4$ represents hydrogen or a hydrocarbon group with 1 to 7 carbon atoms, preferably a hydrocarbon group with 1 to 6 carbon atoms, and more preferably a hydrocarbon group with 1 to 4 carbon atoms.

In the formula (c), $R_5$ represents hydrogen or a hydrocarbon group with 1 to 3 carbon atoms, preferably hydrogen or a hydrocarbon group with 1 carbon atom; and $R_6$ represents hydrogen or a hydrocarbon group with 1 to 7 carbon atoms, preferably a hydrocarbon group with 1 to 6 carbon atoms, and more preferably a hydrocarbon group with 1 to 4 carbon atoms.

In the formula (d), $R_7$ represents hydrogen or a hydrocarbon group with 1 to 3 carbon atoms, preferably hydrogen or a hydrocarbon group with 1 carbon atom; and $R_8$ represents hydrogen or a hydrocarbon group with 1 to 7 carbon atoms, preferably a hydrocarbon group with 1 to 6 carbon atoms, and more preferably a hydrocarbon group with 1 to 4 carbon atoms.

On the other hand, the anionic component is not particularly limited as long as it can be an ionic liquid, and examples thereof include $Cl^-$, $Br^-$, $I^-$, $AlCl_4^-$, $Al_2Cl_7^-$, $BF_4^-$, $PF_6^-$, $ClO_4^-$, $NO_3^-$, $CH_3COO^-$, $CF_3COO^-$, $CH_3SO_3^-$, $CF_3SO_3^-$, $(CF_3SO_2)_2N^-$, $(CF_3SO_2)_3C^-$, $AsF_6^-$, $SbF_6^-$, $NbF_6^-$, $TaF_6^-$, $F(HF)_n^-$, $(CN)_2N^-$, $C_4F_9SO_3^-$, $(C_2F_5SO_2)_2N^-$, $C_3F_7COO^-$, $(CF_3SO_2)(CF_3CO)N^-$, $SCN^-$, $C_2F_5SO_3^-$, $C_3F_7SO_3^-$, $C_4F_9SO_3^-$, $(FSO_2)_2N^-$, $(C_3F_7SO_2)_2N^-$, $(C_4F_9SO_2)_2N^-$, (CH₃O)₂PO₂⁻, (C₂H₅O)₂PO₂⁻, (CN)₂N⁻, (CN)₃C⁻, CH₃OSO₃⁻, C₄H₉OSO₃⁻, C₂H₅OSO₃⁻, n-C₆H₁₃OSO₃⁻, n-C₈H₁₇OSO₃⁻, CH₃(OC₂H₄)₂OSO₃⁻, (C₂F₅)₃PF₃⁻, CH₃C₆H₄SO₃⁻, and the like. Among them, particularly, a fluoroalkyl-containing anionic component containing a fluorine atom is preferably used since an ionic compound with a low melting point can be obtained. Many imide-containing anionic components having an provide hydrophobicity, cause no dissociation even if added to a water-based pressure-sensitive adhesive, generate no agglomerate and the like, and therefore, they are preferably used.

It is also possible to use, as an anion component, an anion represented by the following formula (F).

[Formula 5]

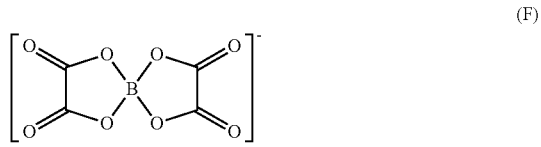
(F)

The ionic liquid used in the present invention is properly selected from combinations of the above cationic components and anionic components, and specific examples thereof include 1-butylpyridinium tetrafluoroborate, 1-butylpyridinium hexafluorophosphate, 1-butyl-3-methylpyridinium tetrafluoroborate, 1-butyl-3-methylpyridinium trifluoromethanesulfonate, 1-butyl-3-methylpyridinium bis(trifluoromethanesulfonyl)imide, 1-butyl-3-methylpyridinium bis(pentafluoroethanesulfonyl)imide, 1-hexylpyridinium tetrafluoroborate, 1,1-dimethylpyrrolidinium bis(trifluoromethanesulfonyl)imide, 1-methyl-1-ethylpyrrolidinium bis(trifluoromethanesulfonyl)imide, 1-methyl-1-propylpyrrolidinium bis(trifluoromethanesulfonyl)imide, 1-methyl-1-butylpyrrolidinium bis(trifluoromethanesulfonyl)imide, 1-methyl-1-pentylpyrrolidinium bis(trifluoromethanesulfonyl)imide, 1-methyl-1-hexylpyrrolidinium bis(trifluoromethanesulfonyl)imide, 1-methyl-1-heptylpyrrolidinium bis(trifluoromethanesulfonyl)imide, 1-ethyl-1-propylpyrrolidinium bis(trifluoromethanesulfonyl)imide, 1-ethyl-1-butylpyrrolidinium bis(trifluoromethanesulfonyl)imide, 1-ethyl-1-pentylpyrrolidinium bis(trifluoromethanesulfonyl)imide, 1-ethyl-1-hexylpyrrolidinium bis(trifluoromethanesulfonyl)imide, 1-ethyl-1-heptylpyrrolidinium bis(trifluoromethanesulfonyl)imide, 1,1-dipropylpyrrolidinium bis(trifluoromethanesulfonyl)imide, 1-propyl-1-butylpyrrolidinium bis(trifluoromethanesulfonyl)imide, 1,1-dibutylpyrrolidinium bis(trifluoromethanesulfonyl)imide, 1-propylpiperidinium bis(trifluoromethanesulfonyl)imide, 1-pentylpiperidinium bis(trifluoromethanesulfonyl)imide, 1,1-dimethylpiperidinium bis(trifluoromethanesulfonyl)imide, 1-methyl-1-ethylpiperidinium bis(trifluoromethanesulfonyl)imide, 1-methyl-1-propylpiperidinium bis(trifluoromethanesulfonyl)imide, 1-methyl-1-butylpiperidinium bis(trifluoromethanesulfonyl)imide, 1-methyl-1-pentylpiperidinium bis(trifluoromethanesulfonyl)imide, 1-methyl-1-hexylpiperidinium bis(trifluoromethanesulfonyl)imide, 1-methyl-1-heptylpiperidinium bis(trifluoromethanesulfonyl)imide, 1-ethyl-1-propylpiperidinium bis(trifluoromethanesulfonyl)imide, 1-ethyl-1-butylpiperidinium bis(trifluoromethanesulfonyl)imide, 1-ethyl-1-pentylpiperidinium bis(trifluoromethanesulfonyl)imide, 1-ethyl-1-hexylpiperidinium bis(trifluoromethanesulfonyl)imide, 1-ethyl-1-heptylpiperidinium bis(trifluoromethanesulfonyl)imide, 1,1-dipropylpiperidinium bis(trifluoromethanesulfonyl)imide, 1-propyl-1-butylpiperidinium bis(trifluoromethanesulfonyl)imide, 1,1-dipropylpiperidinium bis(trifluoromethanesulfonyl)imide, 1-propyl-1-butylpiperidinium bis(pentafluoroethanesulfonyl)imide, 1,1-dibutylpiperidinium bis(pentafluoroethanesulfonyl)imide, 2-methyl-1-pyrroline tetrafluoroborate, 1-ethyl-2-phenylindole tetrafluoroborate, 1,2-dimethylindole tetrafluoroborate, 1-ethylcarbazole tetrafluoroborate, 1-ethyl-2-methylimidazolium tetrafluoroborate, 1-ethyl-2-methylimidazolium acetate, 1-ethyl-2-methylimidazolium trifluoroacetate, 1-ethyl-2-methylimidazolium heptafluorobutyrate, 1-ethyl-2-methylimidazolium trifluoromethanesulfonate, 1-ethyl-2-methylimidazolium perfluorobutanesulfonate, 1-ethyl-2-methylimidazolium dicyanamide, 1-ethyl-2-methylimidazolium bis(trifluoromethanesulfonyl)imide, 1-ethyl-2-methylimidazolium bis(pentafluoroethanesulfonyl)imide, 1-ethyl-2-methylimidazolium tris(trifluoromethanesulfonyl)methyde, 1-butyl-2-methylimidazolium tetrafluoroborate, 1-butyl-2-methylimidazolium hexafluorophosphate, 1-butyl-2-methylimidazolium trifluoroacetate, 1-butyl-2-methylimidazolium heptafluorobutyrate, 1-butyl-2-methylimidazolium trifluoromethanesulfonate, 1-butyl-2-methylimidazolium perfluorobutanesulfonate, 1-butyl-2-methylimidazolium bis(trifluoromethanesulfonyl)imide, 1-hexyl-2-methylimidazolium bromide, 1-hexyl-2-methylimidazolium chloride, 1-hexyl-2-methylimidazolium tetrafluoroborate, 1-hexyl-2-methylimidazolium hexafluorophosphate, 1-hexyl-2-methylimidazolium trifluoromethanesulfonate, 1-octyl-2-methylimidazolium tetrafluoroborate, 1-octyl-2-methylimidazolium hexafluorophosphate, 1-hexyl-2,2-dimethylimidazolium tetrafluoroborate, 1,2-dimethyl-2-propylimidazolium bis(trifluoromethanesulfonyl)imide, 1-methylpyrazolium tetrafluoroborate, 2-methylpyrazolium tetrafluoroborate, 1-ethyl-2,3,5-trimethylpyrazolium bis(trifluoromethanesulfonyl)imide, 1-propyl-2,3,5-trimethylpyrazolium bis(trifluoromethanesulfonyl)imide, 1-butyl-2,3,5-trimethylpyrazolium bis(trifluoromethanesulfonyl)imide, 1-ethyl-2,3,5-trimethylpyrazolium bis(pentafluoroethanesulfonyl)imide, 1-propyl-2,3,5-trimethylpyrazolium bis(pentafluoroethanesulfonyl)imide, 1-butyl-2,3,5-trimethylpyrazolium bis(pentafluoroethanesulfonyl)imide, 1-ethyl-2,3,5-trimethylpyrazolium bis(trifluoromethanesulfonyl)trifluoroacetamide, 1-propyl-2,3,5-trimethylpyrazolium bis(trifluoromethanesulfonyl)trifluoroacetamide, 1-butyl-2,3,5-trimethylpyrazolium bis(trifluoromethanesulfonyl)trifluoroacetamide, 1-ethyl-2,3,5-trimethylpyrazolinium bis(trifluoromethanesulfonyl)imide, 1-propyl-2,3,5-trimethylpyrazolinium bis(trifluoromethanesulfonyl)imide, 1-butyl-2,3,5-trimethylpyrazolinium bis(trifluoromethanesulfonyl)imide, 1-ethyl-2,3,5-trimethylpyrazolinium bis(pentafluoroethanesulfonyl)imide, 1-propyl-2,3,5-trimethylpyrazolinium bis(pentafluoroethanesulfonyl)imide, 1-butyl-2,3,5-trimethylpyrazolinium bis(pentafluoroethanesulfonyl)imide, 1-ethyl-2,3,5-trimethylpyrazolinium bis(trifluoromethanesulfonyl)trifluoroacetamide, 1-propyl-2,3,5-trimethylpyrazolinium bis(trifluoromethanesulfonyl)trifluoroacetamide, 1-butyl-2,3,5-trimethylpyrazolinium bis(trifluoromethanesulfonyl)trifluoroacetamide, tetrapentylammonium trifluoromethanesulfonate, tetrapentylammonium bis(trifluoromethanesulfonyl)imide, tetrahexylammonium trifluoromethanesulfonate, tetrahexylammonium bis(trifluoromethanesulfonyl)imide, tetrabutylammonium trifluoromethanesulfonate, tetraheptylammonium bis(trifluoromethanesulfonyl)imide, diallyldimethylammonium tetrafluoroborate, diallyldimethylammonium trifluoromethanesulfonate, diallyldimethylammonium bis(trifluoromethanesulfonyl)imide, diallyldimethylammonium bis(pentafluoroethanesulfonyl)imide, N,N-diethyl-N-methyl-N-(2-methoxyethyl)ammonium tetrafluoroborate, N,N-diethyl-N-methyl-N-(2-methoxyethyl)ammonium trifluoromethanesulfonate, N,N-diethyl-N-methyl-N-(2-methoxyethyl)ammonium bis(trifluoromethanesulfonyl)imide, N,N-diethyl-N-methyl-N-(2-methoxyethyl)ammonium bis(pentafluoroethanesulfonyl)imide, glycidyltrimethylammonium trifluoromethanesulfonate, glycidyltrimethylammonium bis(trifluoromethanesulfonyl)imide, glycidyltrimethylammonium bis(pentafluoroethanesulfonyl)imide, tetraoctylphosphonium trifluoromethanesulfonate, tetraoctylphosphonium bis(trifluoromethanesulfonyl)imide, N,N-dimethyl-N-ethyl-N-propylammonium bis(trifluoromethanesulfonyl)imide, N,N-dimethyl-N-ethyl-N-butylammonium bis(trifluoromethanesulfonyl)imide, N,N-dimethyl-N-ethyl-N-pentylammonium bis(trifluoromethanesulfonyl)imide, N,N-dimethyl-N-ethyl-N-hexylammonium bis(trifluoromethanesulfonyl)imide, N,N-dimethyl-N-ethyl-N-heptylammonium bis(trifluoromethanesulfonyl)imide, N,N-dimethyl-N-ethyl-N-nonylammonium bis(trifluoromethanesulfonyl)imide, N,N-dimethyl-N,N-dipropylammonium bis(trifluoromethanesulfonyl)imide, N,N-dimethyl-N-propyl-N-butylammonium bis(trifluoromethanesulfonyl)imide, N,N-dimethyl-N-propyl-N-pentylammonium bis(trifluoromethanesulfonyl)imide, N,N-dimethyl-N-propyl-N-hexylammonium bis(trifluoromethanesulfonyl)imide, N,N-dimethyl-N-propyl-N-heptylammonium bis(trifluoromethanesulfonyl)imide, N,N-dimethyl-N-butyl-N-hexylammonium bis(trifluoromethanesulfonyl)imide, N,N-dimethyl-N-butyl-N-heptylammonium bis(trifluoromethanesulfonyl)imide, N,N-dimethyl-N-pentyl-N-hexylammonium bis(trifluoromethanesulfonyl)imide, N,N-dimethyl-N,N-dihexylammonium bis(trifluoromethanesulfonyl)imide, trimethylheptylammonium bis(trifluoromethanesulfonyl)imide, N,N-diethyl-N-methyl-N-propylammonium bis(trifluoromethanesulfonyl)imide, N,N-diethyl-N-methyl-N-pentylammonium bis(trifluoromethanesulfonyl)imide, N,N-diethyl-N-methyl-N-heptylammonium bis(trifluoromethanesulfonyl)imide, N,N-diethyl-N-propyl-N-pentylammonium bis(trifluoromethanesulfonyl)imide, triethylpropylammonium bis(trifluoromethanesulfonyl)imide, triethylpentylammonium bis(trifluoromethanesulfonyl)imide, triethylheptylammonium bis(trifluoromethanesulfonyl)imide, N,N-dipropyl-N-methyl-N-ethylammonium bis(trifluoromethanesulfonyl)imide, N,N-dipropyl-N-methyl-N-pentylammonium bis(trifluoromethanesulfonyl)imide, N,N-dipropyl-N-butyl-N-hexylammonium bis(trifluoromethanesulfonyl)imide, N,N-dipropyl-N,N-dihexylammonium bis(trifluoromethanesulfonyl)imide, N,N-dibutyl-N-methyl-N-pentylammonium bis(trifluoromethanesulfonyl)imide, N,N-dibutyl-N-methyl-N-hexylammonium bis(trifluoromethanesulfonyl)imide, trioctylmethylammonium bis(trifluoromethanesulfonyl)imide, N-methyl-N-ethyl-N-propyl-N-pentylammonium bis(trifluoromethanesulfonyl)imide, 1-butylpyridinium (trifluoromethanesulfonyl)trifluoroacetamide, 1-butyl-3-methylpyridinium (trifluoromethanesulfonyl)trifluoroacetamide, 1-ethyl-3-methylimidazolium (trifluoromethanesulfonyl)trifluoroacetamide, N-ethyl-N-methylmorpholinium thiocyanate, 4-ethyl-4-methylmorpholinium methylcarbonate, and the like.

As the aforementioned ionic liquid, a commercially available ionic liquid may be used, or the liquid may be synthesized as described below. A method of synthesizing an ionic liquid is not particularly limited as far as an objective ionic liquid is obtained. Generally, a halide method, a hydroxide method, an acid ester method, a chelate forming method, and a neutralization method described in the publication "Ionic liquid—The Front and Future of Development—" (published by CMC) are used.

Regarding a halide method, a hydroxide method, an acid ester method, a chelate forming method, and a neutralization method, a synthesis method using an example of a nitrogen-containing onium salt will be shown below, but other ionic liquid such as a sulfur-containing onium salt, and a phosphorus-containing onium salt can be obtained by the similar procedure.

The halide method is a method which is performed by a reaction shown in the following formulas (1) to (3). First, a tertiary amine and alkyl halide are reacted to obtain halide (Reaction Equation (1), as a halogen, chlorine, bromine or iodine is used).

The resulting halide is reacted with an acid (HA) having an anion structure ($A^-$) of an objective ionic liquid or a salt (MA, M is a cation forming a salt with an objective anion such as ammonium, lithium, sodium and potassium) of an objective ionic liquid to obtain an objective ionic liquid ($R_4NA$).

[Formula 6]

$$R_3N + RX \rightarrow R_4NX(X:Cl,Br,I) \quad (1)$$

$$R_4NX + HA \rightarrow R_4NA + HX \quad (2)$$

$$R_4NX + MA \rightarrow R_4NA + MX(M:NH_4, Li, Na, K, Ag \text{ etc.}) \quad (3)$$

The hydroxide method is a method performed by a reaction shown in (4) to (8). First, a halide ($R_4NX$) is subjected to ion exchange membrane method electrolysis (reaction equation (4)), an OH-type ion exchange resin method (reaction equation (5)) or a reaction with silver oxide ($Ag_2O$) (reaction equation (6)) to obtain a hydroxide ($R_4NOH$) (as a halogen, chlorine, bromine or iodine is used).

The resulting hydroxide is subjected to a reaction of reaction equations (7) to (8) as in the aforementioned halide method to obtain an objective ionic liquid ($R_4NA$).

[Formula 7]

$$R_4NX + H_2O \rightarrow R_4NOH + 1/2H_2 + 1/2X_2(X:Cl,Br,I) \quad (4)$$

$$R_4NX + P\text{—}OH \rightarrow R_4NOH + P\text{—}X \text{ (P—OH:OH-type ion exchange resin)} \quad (5)$$

$$R_4NX + 1/2Ag_2O + 1/2H_2O \rightarrow R_4NOH + AgX \quad (6)$$

$$R_4NOH + HA \rightarrow R_4NA + H_2O \quad (7)$$

$$R_4NOH + MA \rightarrow R_4NA + MOH(M:NH_4, Li, Na, K, Ag \text{ etc.}) \quad (8)$$

The acid ester method is a method performed by a reaction shown in (9) to (11). First, tertiary amine ($R_3N$) is reacted with acid ester to obtain an acid esterified substance (reaction equation (9), as acid ester, ester of an inorganic acid such as sulfuric acid, sulfurous acid, phosphoric acid, phosphorous acid, and carbonic acid, or ester of organic acid such as methanesulfonic acid, methylphosphonic acid and formic acid is used).

The resulting acid esterified substance is subjected to a reaction of reaction equations (10) to (11) as in the aforementioned halide method, to obtain an objective ionic liquid ($R_4NA$). Alternatively, as acid ester, methyl trifluoromethane sulfonate, or methyl trifluoroacetate may be used to directly obtain an ionic liquid.

[Formula 8]

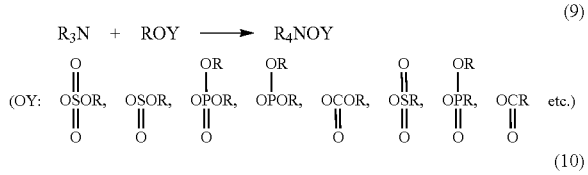

(M: $NH_4$, Li, Na, K, Ag etc.)

The chelate forming method is a method performed by a reaction as shown in (12) to (15). First, halide of quaternary ammonium ($R_4NX$), hydroxide of quaternary ammonium ($R_4NOH$), or carbonic acid esterified substance of quaternary ammonium ($R_4NOCO_2CH_3$) is reacted with hydrogen fluoride (HF) or ammonium fluoride ($NH_4F$) to obtain a quaternary ammonium fluoride salt (reaction equation (12) to (14)).

The resulting quaternary ammonium fluoride salt can be subjected to a chelate forming reaction with fluoride such as $BF_3$, $AlF_3$, $PF_5$, $AsF_5$, $SbF_5$, $NbF_5$ and $TaF_6$, to obtain an ionic liquid (reaction equation (15)).

[Formula 9]

$$R_4NX + HF \rightarrow R_4NF + HX(X:Cl,Br,I) \quad (12)$$

$$R_4NY + HF \rightarrow R_4NF + HY(Y:OH,OCO_2CH_3) \quad (13)$$

$$R_4NY + NH_4F \rightarrow R_4NF + NH_3 + HY(Y:OH,OCO_2CH_3) \quad (14)$$

$$R_4NF + MF_{n-1} \rightarrow R_4NMF_n \quad (15)$$

($MF_{n-1}$: $BF_3$, $AlF_3$, $PF_5$, $AsF_5$, $SbF_5$, $TaF_5$ etc.)

The neutralization method is a method performed by a reaction shown in (16). An ionic liquid can be obtained by reacting tertiary amine and an organic acid such as $HBF_4$, $HPF_6$, $CH_3COOH$, $CF_3COOH$, $CF_3SO_3H$, $(CF_3SO_2)_2NH$, $(CF_3SO_2)_3CH$, and $(C_2F_5SO_2)_2NH$.

[Formula 10]

$$R_3N + HZ \rightarrow R_3HN^+Z^- \quad (16)$$

[HZ: $HBF_4$, $HPF_6$, $CH_3COOH$, $CF_3COOH$, $CF_3SO_3H$, $(CF_3SO_2)_2NH$, $(CF_3SO_2)_3CH$, $(C_2F_9SO_2)_2NH$ organic acid such as]

The aforementioned R in (1) to (16) represents hydrogen or a hydrocarbon group of a carbon number of 1 to 20, and a part of the hydrocarbon group may be functional group substituted with a hetero atom.

[Alkali Metal Salt]

Due to high ionic dissociation, the alkali metal salts are preferable in terms of exhibition of excellent antistatic capability even with a very small amount of addition. Examples of the alkali metal salts preferably used include metal salts composed of cations such as $Li^+$, $Na^+$, and $K^+$ and anions such as $Cl^-$, $Br^-$, $I^-$, $AlCl_4^-$, $Al_2Cl_7^-$, $BF_4^-$, $PF_6^-$, $SCN^-$, $ClO_4^-$, $NO_3^-$, $CH_3COO^-$, $C_9H_{19}COO^-$, $CF_3C^-$, $C_3F_7COO^-$, $CH_3SO_3^-$, $CF_3SO_3^-$, $C_4F_9SO_3^-$, $C_2H_5OSO_3^-$, $C_6H_{13}OSO_3^-$, $C_8H_{17}OSO_3^-$, $(CF_3SO_2)_2N^-$, $(C_2F_5SO_2)_2N^-$, $(C_3F_7SO_2)_2N^-$, $(C_4F_9SO_2)_2N^-$, $(CF_3SO_2)_3C^-$, $AsF_6^-$, $SbF_6^-$, $NbF_6^-$, $TaF_6^-$, $F(HF)_n^-$, $(CN)_2N^-$, $(CF_3SO_2)(CF_3CO)N^-$, $(CH_3)_2PO_4^-$, $(C_2H_5)_2PO_4^-$, $CH_3(OC_2H_4)OSO_3^-$, $C_6H_4(CH_3)SO_3^-$, $(C_2F_5)_3PF_3^-$, $CH_3CH(OH)COO^-$, and $(FSO_2)_2N^-$. More preferably used are lithium salts such as LiBr, LiI, $LiBF_4$, $LiPF_6$, LiSCN, $LiClO_4$, $LiCF_3SO_3$, $Li(CF_3SO_2)_2N$, $Li(C_2F_5SO_2)_2N$, $Li(FSO_2)_2N$, $Li(CF_3SO_2)_3C$, and further preferably used are $LiCF_3SO_3$, $Li(CF_3SO_2)_2N$, $Li(C_2F_5SO_2)_2N$, $Li(C_3F_7SO_2)_2N$, $Li(C_4F_9SO_2)_2N$, $Li(FSO_2)_2N$, and $Li(CF_3SO_2)_3C$. These alkali metal salts may be used alone or two or more thereof may be used in combination.

Regarding the alkali metal salt, a fluoroalkyl-containing anionic component containing a fluorine atom is particularly preferably used since an ionic compound with a low melting point can be obtained. Many imide-containing anionic components provide hydrophobicity, and cause no dissociation even if added to a water-based pressure-sensitive adhesive and therefore, they are preferably used.

The blend amount of the ionic compound cannot be defined indiscriminately since it changes depending on the affinity of the ionic compound and a polymer to be used, but for example, it is preferably 0.5 to 3.0 parts by weight, more preferably 0.6 to 2.5 parts by weight, and furthermore preferably 0.7 to 2.0 parts by weight per 100 parts by weight (solid matter) of the base polymer (acrylic emulsion-based polymer). If it is less than 0.5 parts by weight, no antistatic property is obtained and if it exceeds 3.0 parts by weight, contamination to an adherend may possibly be increased.

[Re-Peelable Water Dispersion Type Acryl-Based Pressure-Sensitive Adhesive Composition]

As described above, the re-peelable water dispersion type acryl-based pressure-sensitive adhesive composition of the prevent invention contains the acrylic emulsion-based polymer of the present invention, the perfluoroalkyl-containing oligomer, and the ionic compound as indispensable components and, if necessary, may further contain various kinds of other additives.

The pressure-sensitive adhesive composition of the present invention preferably does not contain substantially a so-called nonreactive (nonpolymerizable) component (excluding component such as water which is volatilized by drying and does not remain in pressure-sensitive adhesive layer) other than a reactive (polymerizable) component incorporated into the polymer forming the pressure-sensitive adhesive layer by reaction (polymerization) with the raw material monomers or the like of the acrylic emulsion-based polymer. If a nonreactive component remains in the pressure-sensitive adhesive layer, this component is transferred to an adherend and may cause whitening pollution. Herein, "does not contain substantially" refers to the case of no positive addition except inevitable contamination, and practically, the content of the nonreactive component in the pressure-sensitive adhesive composition (non-volatile components) is preferably less than 1% by weight, more preferably less than 0.1% by weight, and furthermore preferably less than 0.005% by weight.

Examples of the nonreactive component include components such as a phosphoric acid ester-based compound used in JP-A 2006-045412, which bleed in the pressure-sensitive adhesive layer surface to provide peeling properties, and the like, and also include nonreactive emulsifiers such as sodium laurylsulfate and ammonium lauryl sulfate.

The pressure-sensitive adhesive composition of the present invention may contain various kinds of additives other than those described above to the extent that the additives do not cause an effect on the contamination properties. Examples of the various kinds of additives include a pigment, a filler, a leveling agent, a dispersant, a plasticizer, a stabilizer, an antioxidant, an ultraviolet absorber, an ultraviolet stabilizer, a defoaming agent, an aging prevention agent, a preserver, and the like.

The pressure-sensitive adhesive composition of the present invention can be produced by mixing the above-mentioned acrylic emulsion-based polymer, water-insoluble crosslinking agent, and ionic compound. If necessary, various kinds of other additives may be mixed. The mixing method to be employed may be a conventionally-known emulsion mixing method, and for example, without any particular limitation, stirring using a stirrer is preferable. The stirring condition is not particularly limited but, for example, the stirring temperature is preferably 10 to 50° C. and more preferably 20 to 35° C. The stirring time is preferably 5 to 30 minutes and more preferably 10 to 20 minutes. The stirring rotation rate is preferably 10 to 3000 rpm and more preferably 30 to 1000 rpm.

[Pressure-Sensitive Adhesive Layer and Pressure-Sensitive Adhesive Sheet]

The pressure-sensitive adhesive layer (pressure-sensitive adhesive sheet) of the present invention is formed of the re-peelable water dispersion type acryl-based pressure-sensitive adhesive composition. A method of forming a pressure-sensitive adhesive layer is not particularly limited and a conventionally-known method of forming a pressure-sensitive adhesive layer can be employed. The pressure-sensitive adhesive layer can be formed by applying the pressure-sensitive adhesive composition onto a substrate or a peeling film (peeling liner) and thereafter drying the pressure-sensitive adhesive composition. If the pressure-sensitive adhesive layer is formed on a peeling (release) film, the pressure-sensitive adhesive layer is stuck to a substrate and then transferred.

The solvent-insoluble matter (gel ratio) of the pressure-sensitive adhesive layer (after crosslinked) in the pressure-sensitive adhesive sheet of the present invention is preferably 90% (% by weight) or more, and more preferably 95% by weight or more. If the solvent-insoluble matter is less than 90% by weight, pollutant transfer to an adherend may be increased so that whitening pollution is caused, and the re-peeling properties may become insufficient (heavy peeling properties). The solvent-insoluble matter of the pressure-sensitive adhesive layer (after crosslinked) can be measured in the same manner as in the above-mentioned measurement method for the solvent-insoluble matter of the acrylic emulsion-based polymer. Practically, the measurement can be carried out, in the above "measurement method for solvent-insoluble matter", by interpreting "acrylic emulsion-based polymer" as "pressure-sensitive adhesive layer (after crosslinked)".

In the case of forming the pressure-sensitive adhesive layer (pressure-sensitive adhesive sheet), the temperature at the time of drying is usually about 80 to 170° C. and preferably 80 to 160° C., and the drying time is about 0.5 to 30 minutes and preferably 1 to 10 minutes. Further, aging is carried out at room temperature to about 50° C. for 1 day to 1 week to produce the pressure-sensitive adhesive layer (pressure-sensitive adhesive sheet).

Various kinds of methods are employed for the step for applying the pressure-sensitive adhesive composition. Specific examples of the methods include roll coating, kiss roll coating, gravure coating, reverse coating, roll brush, spray coating, dip roll coating, bar coating, knife coating, air knife coating, curtain coating, lip coating, extrusion coating by a die coater, and the like.

The application amount thereof is controlled such that a pressure-sensitive adhesive layer to be formed has a prescribed thickness (thickness after drying) in the application step. The thickness of the pressure-sensitive adhesive layer (thickness after drying) is usually set in a range of about 1 to 100 μm, preferably 5 to 50 μm, and more preferably 10 to 40 μm.

Examples of a material constituting the above peeling film include plastic films such as films of polyethylene, polypropylene, polyethylene terephthalate, and polyester; porous materials such as paper, cloth, and nonwoven fabric; nets, foamed sheets, metal foils, and proper thin sheet bodies such as their laminates. In terms of excellent surface smoothness, plastic films are used preferably.

The plastic films are not particularly limited as long as they are films capable of protecting the pressure-sensitive adhesive layer, and examples thereof include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, an ethylene-vinyl acetate copolymer film, and the like.

The thickness of the peeling film is usually 5 to 200 μm and preferably about 5 to 100 μm.

If necessary, the peeling film may be subjected to release and stain-resistant treatment by a silicone-based, a fluorine-based, a long chain alkyl-based, or a fatty acid amide-based release agent, a silica powder and the like, and to antistatic treatment by application type, kneading type, and vapor deposition type treatment. Particularly, the peeling properties from the pressure-sensitive adhesive layer can be more improved by properly carrying out peeling (release) treatment such as silicone treatment, long chain alkyl treatment, and fluorine treatment for the surface of the peeling film.

In the case where the pressure-sensitive adhesive layer is exposed, the pressure-sensitive adhesive layer may be protected with a peeling film until it is practically used. The peeling film may be used as it is as a separator for a pressure-sensitive adhesive type optical film, and simplification in the steps can be achieved.

Formation of the pressure-sensitive adhesive layer (pressure-sensitive adhesive layer formed of the pressure-sensitive adhesive composition of the present invention) on at least one surface of a substrate (referred to as "support" or "supporting substrate") gives a pressure-sensitive adhesive sheet (pressure-sensitive adhesive sheet stuck to a substrate; pressure-sensitive adhesive sheet having the pressure-sensitive adhesive layer on at least one surface side of a substrate). The pressure-sensitive adhesive layer can be used as it is as a pressure-sensitive adhesive sheet without a substrate. Hereinafter, the pressure-sensitive adhesive sheet stuck to a substrate is may be referred to as "pressure-sensitive adhesive sheet of the present invention".

The pressure-sensitive adhesive sheet (the pressure-sensitive adhesive sheet stuck to a substrate) of the present invention is obtained by, for example, applying the pressure-sensitive adhesive composition of the present invention onto at least one surface side of a substrate, and if necessary, drying the pressure-sensitive adhesive composition to form a pressure-sensitive adhesive layer on at least one surface side of the substrate (direct printing method). Crosslinking may be carried out by dehydration in the drying step, heating the pressure-sensitive adhesive sheet after drying, or the like. The pressure-sensitive adhesive sheet can be also obtained by forming a pressure-sensitive adhesive layer on a peeling film once and transferring the pressure-sensitive adhesive layer onto a substrate (transfer method). Although the method is not particularly limited, the pressure-sensitive adhesive layer is preferably formed by so-called direct printing method of directly applying the pressure-sensitive adhesive composition onto the substrate surface.

The substrate for the pressure-sensitive adhesive sheet of the present invention is preferably a plastic substrate (e.g., a plastic film or a plastic sheet) from the viewpoint of obtaining a pressure-sensitive adhesive sheet with high transparency. Examples of a material for the plastic substrate include, but are not particularly limited to, transparent resins, e.g., polyolefins (polyolefin-based resins) such as polypropylene and polyethylene; polyesters (polyester-based resins) such as polyethylene terephthalate (PET); polycarbonates, polyamides, polyimides, acryl, polystyrenes, acetates, polyether sulfones, triacetyl cellulose, and the like. These resins may be used alone or in combination of two or more thereof. Among these substrates, although not particularly limited to, polyester-based resins and polyolefin-based resins are preferably used and PET, polypropylene, and polyethylene are more preferably used in terms of productivity and formability. That is, as the substrate, polyester-based films and polyolefin-based films are preferable and a PET film, a polypropylene film, and a polyethylene film are more preferable. Examples of the polypropylene include, but are not particularly limited to, a homo-type, which is a homopolymer; a random type, which is an α-olefin random copolymer; and a block type, which is an α-olefin block copolymer. Examples of the polyethylene include low density polyethylene (LDPE), high density polyethylene (HDPE), and linear low density polyethylene (L-LDPE). These plastics may be used alone or in combination of two or more thereof.

The thickness of the substrate is not particularly limited, but it is preferably 10 to 150 μm and more preferably 30 to 100 μm.

For the purpose of improving the adhesive strength to the pressure-sensitive adhesive layer, the surface of the substrate on the side where the pressure-sensitive adhesive layer is to be formed is preferably subjected to easy adhesion treatment such as acid treatment, alkali treatment, primer treatment, corona treatment, plasma treatment, and ultraviolet treatment. An intermediate layer may be formed between the substrate and the pressure-sensitive adhesive layer. The thickness of the intermediate layer is preferably, for example, 0.05 to 1 μm and more preferably 0.1 to 1 μm.

The pressure-sensitive adhesive sheet of the present invention may be formed into a rolled body, and may be wound into a roll in the state where the pressure-sensitive adhesive layer is protected by a peeling film (separator). Further, the rear surface of the pressure-sensitive adhesive sheet (surface on the side opposite to the side where the pressure-sensitive adhesive layer is formed) may be subjected to release treatment and/or stain-resistant treatment with a silicone-based, a fluorine-based, a long chain alkyl-based or a fatty acid amide-based release agent, a silica powder or the like to form a rear surface treatment layer (release treatment layer, stain-resistant treatment layer, etc.). The pressure-sensitive adhesive sheet of the present invention is especially preferable to have a configuration of pressure-sensitive adhesive layer/substrate/rear surface treatment layer.

The pressure-sensitive adhesive sheet of the present invention is more preferably subjected to antistatic treatment. The antistatic treatment may be a common antistatic treatment method, and examples thereof include, but are not particularly limited to, a method for forming an antistatic layer on the substrate rear surface (surface on the side opposite to the side where the pressure-sensitive adhesive layer is formed) and a method for kneading a kneading type antistatic agent in the substrate.

Examples of a method for forming an antistatic layer include a method of applying an antistatic agent, or an antistatic resin containing an antistatic agent and a resin component, or a conductive resin composition or conductive polymer containing a conductive substance and a resin component; a method for depositing a conductive substance or plating with a conductive substance; and the like.

Examples of the antistatic agent include cationic antistatic agents having a cationic functional group such as a quaternary ammonium salt and a pyridinium salt (e.g., primary amino group, secondary amino group, and tertiary amino group); anionic antistatic agents having an anionic functional group such as a sulfonic acid salt, a sulfuric acid ester salt, a phosphonic acid salt, and a phosphoric acid ester salt; amphoteric ionic antistatic agent such as alkylbetain and its derivatives, imidazoline and its derivatives, and alanine and its derivatives; nonionic antistatic agents such as aminoalcohol and its derivatives, glycerin and its derivatives, and polyethylene glycol and its derivatives; and further ion conductive polymers obtained by polymerization or copolymerization of monomers having ion conductive groups shown in the cationic antistatic agents, anionic antistatic agents, and amphoteric antistatic agents.

Practically, examples of the cationic antistatic agents include (meth)acrylate copolymers having a quaternary ammonium group such as an alkyltrimethylammonium salt, acyloylamidopropyltrimethyl ammonium methosulfate, an alkylbenzylmethylammonium salt, acyl choline chloride, and polydimethylaminoethyl methacrylate; styrene-based copolymers having a quaternary ammonium group such as polyvinylbenzyltrimethylammonium chloride; diallylamine copolymers having a quaternary ammonium group such as polydiallyldimethylammonium chloride; and the like. Examples of the anionic antistatic agents include an alkylsulfonic acid salt, an alkylbenzenesulfonic acid salt, an alkylsulfuric acid ester salt, an alkylethoxysulfuric acid ester salt, an alkylphosphoric acid ester salt, a sulfonic acid group-containing styrene-based copolymer, and the like. Examples of the amphoteric ionic antistatic agents include an alkylbetain, an alkylimidazolium betain, a carbobetain graft copolymer, and the like. Examples of the nonionic antistatic agents include fatty acid alkylolamide, di-(2-hydroxyethyl)alkylamine, polyoxyethylene alkylamine, a fatty acid glycerin ester, a polyoxyethylene glycol fatty acid ester, a sorbitan fatty acid ester, a polyoxysorbitan fatty acid ester, polyoxyethylene alkylphenyl ether, polyoxyethylene alkyl ether, polyethylene glycol, polyoxyethylene diamine, a copolymer composed of a polyether and a polyester, methoxypolyethylene glycol (meth)acrylate, and the like.

Examples of the conductive polymer include polyaniline, polypyrrole, polythiophene, and the like.

Examples of the electrically conductive substance include tin oxide, antimony oxide, indium oxide, cadmium oxide, titanium oxide, zinc oxide, indium, tin, antimony, gold, silver, copper, aluminum, nickel, chromium, titanium, iron, covert, copper iodide, and an alloy and a mixture thereof. These electrically conductive substances may be used alone, or two or more kinds may be used by mixing.

Examples of the resin component include popular resins such as polyester, acrylic, polyvinyl, urethane, melamine, and epoxy resins. In the case where the antistatic agent is a polymer type antistatic agent, the antistatic resin may not contain the above-mentioned resin component. The antistatic resin may contain, as a crosslinking agent, a methylolated or alkylolated melamine-based, urea-based, glyoxal-based, and acrylamide-based compound, an epoxy-based compound, and an isocyanate-based compound.

An example of the method for forming the antistatic layer by application includes a method for diluting the above antistatic resin, conductive polymer, and conductive resin composition with a medium or a dispersant such as an organic solvent or water and applying the obtained coating solution to a substrate, followed by drying. Examples of the organic solvent include methyl ethyl ketone, acetone, ethyl acetate, tetrahydrofuran, dioxane, cyclohexanone, n-hexane, toluene, xylene, methanol, ethanol, n-propanol, isopropanol, and the like. These solvents may be used alone or in combination of two or more thereof. As the application method, conventionally known application methods are employed and practical examples thereof include roll coating, gravure coating, reverse coating, roll brush, spray coating, air knife coating, immersion and curtain coating methods.

The thickness of the antistatic layer (antistatic resin layer, conductive polymer layer, and conductive resin composition layer) formed by application is preferably 0.001 to 5 μm and more preferably 0.005 to 1 μm.

Examples of a method of depositing or plating an electrically conductive substance include vacuum deposition, sputtering, ion plating, chemical deposition, spray pyrolysis, chemical plating, and electric plating methods.

The thickness of the antistatic layer (conductive substance layer) formed by the vapor deposition or plating is preferably 20 to 10000 angstroms (0.002 to 1 μm) and more preferably 50 to 5000 angstroms (0.005 to 0.5 μm).

As the kneading type antistatic agent, the antistatic agents may be used properly. The blend amount of the kneading type antistatic agent is preferably 20% by weight or lower, and more preferably 0.05 to 10% by weight per total weight (100% by weight) of the substrate. A kneading method is not particularly limited as long as the method can evenly mixing the kneading type antistatic agent with a resin to be used for, for example, a plastic substrate and generally, examples thereof include methods using a heating roll, a Banbury mixer, a pressure kneader, a biaxial kneader, and the like.

The re-peelable water dispersion type acryl-based pressure-sensitive adhesive composition of the present invention is a pressure-sensitive adhesive composition excellent in antistatic properties, adherability, and re-peelable properties (easy peelable properties) and capable of forming a re-peelable pressure-sensitive adhesive layer, and the composition is used for forming a pressure-sensitive adhesive layer (re-peelable) used for re-peeling. That is, the pressure-sensitive adhesive sheet having the pressure-sensitive adhesive layer are preferably used for re-peeling [e.g., masking tapes such as a masking tape for construction aging, a masking tape for automotive coating, a masking tape for electronic parts (lead frame, printed board, etc.), and a masking tape for sand blast; surface protecting films such as a surface protecting film for aluminum sashes, a surface protecting film for optical plastics, a surface protecting film for optical glass, a surface protecting film for automotive protection, and a surface protecting film for metal plates; pressure-sensitive adhesive tapes for semiconductor/electronic part production processes such as a backgriding tape, a tape for pellicle fixation, a tape for dicing, a tape for lead frame fixation, a cleaning tape, a dust removal tape, a carrier tape, and a cover tape; wrapping tapes for electronic appliances and electronic parts; temporary fixation tapes for transportation, bundling tapes; and labels], and the like.

The pressure-sensitive adhesive sheet of the present invention is also preferably used for surface protection (surface-protecting films for optical members, etc.) of optical members (optical plastics, optical glass, optical films, etc.) such as polarizing plates, retardation plates, anti-reflection plates, wave plates, optical compensation films, and brightness improvement films constituting panels such as liquid crystal displays, organic electroluminescence (organic EL), and field emission displays. However, use of the pressure-sensitive adhesive sheet is not limited thereto and the sheet may be used for surface protection and breakage prevention at the time of producing finely processed parts such as semiconductors, circuits, various kinds of printed circuit boards, various kinds of masks, and lead frames, or for removing foreign matters, etc., or masking, or the like.

EXAMPLES

Hereinafter, the present invention will be described in detail based on Examples; however, the invention should not be limited to these Examples. In the following description, "part(s)" and "%" are on the basis of weight unless otherwise specified.

Example 1

Preparation of Acrylic Emulsion-Based Polymer

After 90 parts by weight of water and, as shown in Table 1, 92 parts by weight of 2-ethylhexyl acrylate (2EHA), 4 parts by weight of acrylic acid (AA), 4 parts by weight of methyl methacrylate (MMA), and 3 parts by weight of a reactive nonionic anionic emulsifier (trade name; Aqualon HS-1025, manufactured by DAI-ICHI KOGYO SEIYAKU CO., LTD.) were loaded to a container, the components were stirred and mixed by a homomixer to obtain a monomer emulsion.

A reaction container equipped with a condenser, a nitrogen gas introduction tube, a thermometer, and a stirrer were then added with 50 parts by weight of water, 0.01 parts by weight of a polymerization initiator (ammonium persulfate), and the monomer emulsion in an amount equivalent to 10% by weight and, under a stirring condition, emulsion polymerization was performed at 65° C. for 1 hour. Thereafter, 0.05 parts by weight of the polymerization initiator (ammonium persulfate) was further added and successively, under a stirring condition, the remaining of the monomer emulsion (amount equivalent to 90% by weight) was added over 3 hours and allowed to react at 75° C. for 3 hours. Next, the reaction product was cooled to 30° C. and added with ammonia water with 10% by weight concentration to adjust pH to 8 to obtain a water dispersion of an acrylic emulsion-based polymer (concentration of acrylic emulsion-based polymer: 42% by weight).

(Preparation of Re-Peelable Water Dispersion Type Acryl-Based Pressure-Sensitive Adhesive Composition)

To the water dispersion of the acrylic emulsion-based polymer were mixed with 2.5 parts by weight of an epoxy-based crosslinking agent, which is a water-insoluble crosslinking agent [trade name: "TETRAD-C"; manufactured by MITSUBISHI GAS CHEMICAL COMPANY, INC.; 1,3-bis(N, N-diglycidylaminomethyl)cyclohexane; epoxy equivalent: 110; and number of functional groups: 4], 1 part by weight of N-butyl-3-methylpyridinium bistrifluoromethanesulfonylimide [trade name: "CIL-312", manufactured by Japan Carlit Co., Ltd.; effective component 100% by weight], and 1 part by weight of a perfluoroalkyl-containing oligomer (trade name: "Megafac F-477", manufactured by DIC Corporation; effective component 100% by weight) per 100 parts by weight of the acrylic emulsion-based polymer (solid matter), while stirring with a stirrer under stirring condition of 23° C. and 300 rpm for 10 minutes, to prepare a re-peelable water dispersion type acryl-based pressure-sensitive adhesive composition.

(Formation of Pressure-Sensitive Adhesive Layer and Production of Pressure-Sensitive Adhesive Sheet)

The re-peelable water dispersion type acryl-based pressure-sensitive adhesive composition was applied (coated) onto a surface of a PET film (trade name: "T100M38", manufactured by Mitsubishi Plastics Inc.; thickness: 38 μm), which was subjected to corona treatment, using an applicator manufactured by TESTER SANGYO CO., LTD. so as to have a thickness of 15 μm thickness after drying, and then dried at 120° C. for 2 minutes in a hot air circulation type oven and successively aged at room temperature for 1 week to obtain a pressure-sensitive adhesive sheet.

Example 2 and Comparative Examples 1 to 3>

As shown in Table 1, the blend contents, the blend amounts and the like were changed and re-peelable water dispersion type acryl-based pressure-sensitive adhesive compositions were prepared in the same manner as in Example 1. Additives not described in the Table were added in the same amounts as those in Example 1. Pressure-sensitive adhesive sheets were obtained in the same manner as in Example 1 using the re-peelable water dispersion type acryl-based pressure-sensitive adhesive compositions.

[Evaluation]

Each water dispersion type acryl-based pressure-sensitive adhesive composition and each pressure-sensitive adhesive sheet obtained in the Examples and the Comparative Examples were evaluated by the following measurement methods and evaluation methods. The evaluation results are shown in Table 2.

(1) Peeling Electrification Voltage

Each produced pressure-sensitive adhesive sheet was cut into a size of 70 mm in width and 130 mm in length, and after the separator was peeled off, the pressure-sensitive adhesive sheet was pressure-bonded to the surface of a polarizing plate (trade name: "SEG 1425AGS 2B" (S2B in Table 2), manufactured by NITTO DENKO CORPORATION) stuck to an acrylic plate (Acrylite, manufactured by MITSUBISHI RAYON CO., LTD.; thickness: 1 mm; width: 70 mm; length: 100 mm), which was previously treated for static elimination, by a hand roller such that one rim part was extruded out by 30 mm. Successively, after allowed to stand in conditions of 23° C.×24±2% RH for 1 day, the resulting sample was set at a prescribed position as shown in FIG. 1. The one rim part extruded by 30 mm was fixed in an automatic winder, and the pressure-sensitive adhesive sheet was peeled off at a peeling angle of 150° and a peeling rate of 10 m/minute and 30 m/minute. The potential generated in the polarizing plate surface at that time was measured by a potentiometer (KSD-0103, manufactured by KASUGA ELECTRIC WORKS LTD.) fixed at a prescribed position. The distance between the sample and the potentiometer was 100 mat the time of measuring the potential in the polarizing plate surface. The measurement was carried out in conditions of 23° C.×24±2% RH.

The peeling electrification voltage (absolute value) of the pressure-sensitive adhesive sheet of the present invention is preferably 1.2 kV or lower and more preferably 1.0 kV or lower. If the peeling electrification voltage exceeds 1.2 kV, dust is easily adsorbed at the time of peeling off the pressure-sensitive adhesive sheet and the polarizer arrangement in the polarizing plate is disordered and therefore, it is not preferable.

(2) Initial Peeling Power

Each produced pressure-sensitive adhesive sheet was cut into a size of 25 mm in width and 100 mm in length and after the separator was peeled off, the pressure-sensitive adhesive sheet was laminated on a polarizing plate (trade name: "SEG 1425AGS 2B" (S2B in Table 2), manufactured by NITTO DENKO CORPORATION; width: 70 mm; thickness: 100 mm) by a laminating apparatus (Compact laminating apparatus, manufactured by TESTER SANGYO CO., LTD.) in conditions of 0.25 MPa and 0.3 m/minute to obtain an evaluation sample.

After the lamination, the sample was allowed to stand in conditions of 23° C.×50% RH for 30 minutes and subjected to measurement of adhesive power (N/25 mm) at the time of peeling off at a peeling angle of 180° and a peeling rate of 0.3 m/minute and 30 m/minute using a tension tester as "initial peeling power". The measurement was carried out under environments of 23° C.×50% RH.

The initial peeling power of the pressure-sensitive adhesive sheet of the present invention is preferably 0.01 to 0.12 N/25 mm and more preferably 0.02 to 0.10 N/25 mm at a peeling rate of 0.3 m/minute (low rate peeling). If the peeling power is adjusted within the range, the blistering and peeling separation of the pressure-sensitive adhesive sheet is suppressed during the production process, and the protecting function as a surface protecting pressure-sensitive adhesive sheet is sufficiently exhibited and therefore, it is preferable.

TABLE 1

| Blend contents (parts by weight: solid matter) | | | Example 1 | Example 2 | Comparative Example 1 | Comparative Example 2 | Comparative Example 3 |
|---|---|---|---|---|---|---|---|
| Acrylic emulsion-based polymer | Raw material monomers | 2EHA | 92 | 92 | 92 | 92 | 92 |
| | | AA | 4 | 4 | 4 | 4 | 4 |
| | | MMA | 4 | 4 | 4 | 4 | 4 |
| | Emulsifier | HS-1025 | 3 | 3 | 3 | 3 | 3 |
| Re-peelable water dispersion type acryl-based pressure-sensitive adhesive composition | Acrylic emulsion-based polymer | | 100 | 100 | 100 | 100 | 100 |
| | Water-insoluble crosslinking agent | T/C | 2.5 | 2.5 | 2.5 | 2.5 | 2.5 |
| | Ionic liquid | CIL-312 | 1 | 1 | | | 1 |
| | Perfluoroalkyl-containing compound | F-477 | 1 | | | | |
| | | S-386 | | 1 | | | |
| | | EFKA-3570 | | | | 1 | |
| | | F-444 | | | | | 1 |

TABLE 2

| Evaluation results | Peeling rate | Adherend | Example 1 | Example 2 | Comparative Example 1 | Comparative Example 2 | Comparative Example 3 |
|---|---|---|---|---|---|---|---|
| Peeling electrification voltage (initial) [N/25 mm] | 10 m/minute | S2B | 0.4 | 0.9 | 3.0 | 2.4 | 3.0 |
| | 30 m/minute | S2B | 0.5 | 1.0 | 2.7 | 3.3 | 2.6 |
| Adhesive power (initial) [N/25 mm] | 0.3 m/minute | S2B | 0.07 | 0.09 | 0.15 | 0.10 | 0.13 |

The weight of solid matter is shown in the blend contents in Table 1. The abbreviations in Table 1 are as follows:

2EHA: 2-ethylhexyl acrylate,
AA: acrylic acid,
MMA: methyl methacrylate,
HS-1025: trade name: "Aqualon HS-1025", manufactured by DAI-ICHI KOGYO SEIYAKU CO., LTD., (reactive nonionic anionic emulsifier),
T/C: trade name: "TETRAD-C", manufactured by MITSUBISHI GAS CHEMICAL COMPANY, INC., (1,3-bis(N, N-diglycidylaminomethyl)cyclohexane, epoxy equivalent: 110, number of functional groups: 4),
CIL-312: trade name: "CIL-312", manufactured by Japan Carlit Co., Ltd., (N-butyl-3-methylpyridinium bistrifluoromethanesulfonylimide),
F-477: trade name: "Megafac F-477", manufactured by DIC Corporation (perfluoroalkyl-containing oligomer),
S-386: trade name: "Surflon S-386", manufactured by AGC SEIMI CHEMICAL CO., LTD. (perfluoroalkyl compound),
EFKA-3570: trade name: "EFKA-3570", manufactured by BASF, (perfluorocarbon-containing polyacrylate), and
F-444: trade name: "Megafac F-444", manufactured by DIC Corporation (perfluoroalkyl-containing polyoxyethylene ether).

From the evaluation results in Table 2, it was confirmed that pressure-sensitive adhesive layers (pressure-sensitive adhesive sheets) excellent in antistatic properties, adherability, and re-peelable properties were obtained in all of the Examples.

On the other hand, in Comparative Example 1, since no perfluoroalkyl-containing oligomer was blended, the peeling electrification voltage and the adhesive power were high. In Comparative Example 2, since no ionic compound was blended and a perfluorocarbon-containing polyacrylate different from the perfluoroalkyl-containing oligomer was blended, and as a result, the antistatic properties were considerably worsened. In Comparative Example 3, since a perfluoroalkyl-containing polyoxyethylene ether different from the perfluoroalkyl-containing oligomer was blended, and as a result, not only the antistatic properties but also the adherability were inferior.

EXPLANATION OF THE REFERENCE NUMERALS

1 Potential meter
2 Pressure-sensitive adhesive sheet
3 Polarizing plate
4 Acrylic plate
5 Sample mount

What is claimed is:

1. A water dispersion acryl-based pressure-sensitive adhesive composition comprising an acrylic emulsion-based polymer composed of a (meth)acrylic acid alkyl ester and a carboxyl-containing unsaturated monomer as raw material monomers, a perfluoroalkyl-containing oligomer, and an ionic compound, wherein the acryl-based pressure-sensitive adhesive composition is capable of forming a re-peelable pressure-sensitive adhesive layer.

2. The water dispersion acryl-based pressure-sensitive adhesive composition according to claim 1, wherein the ionic compound comprises a fluoroalkyl-containing anion.

3. The water dispersion acryl-based pressure-sensitive adhesive composition according to claim 1, wherein the ionic compound comprises an imide-containing anion.

4. The water dispersion acryl-based pressure-sensitive adhesive composition according to claim 1, wherein the ionic compound is an ionic liquid and comprises at least one kind of cation selected from the group consisting of cations represented by the following formulas (A) to (E):

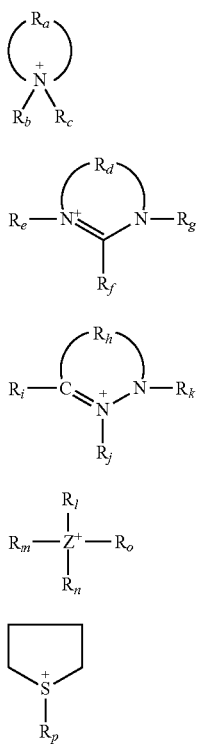

(A)

(B)

(C)

(D)

(E)

in the formula (A), Ra represents a hydrocarbon group with 4 to 20 carbon atoms or is optionally a functional group formed by partially substituting the hydrocarbon group with a heteroatom; and Rb and Rc are the same or different, and represent hydrogen or a hydrocarbon group with 1 to 16 carbon atoms or are optionally a functional group formed by partially substituting the hydrocarbon group with a heteroatom; provided that the nitrogen atom contains a double bond, there is no Rc;

in the formula (B), Rd represents a hydrocarbon group with 2 to 20 carbon atoms or is optionally a functional group formed by partially substituting the hydrocarbon group with a heteroatom; and Re, Rf, and Rg are the same or different, and represent hydrogen or a hydrocarbon group with 1 to 16 carbon atoms or are optionally a functional group formed by partially substituting the hydrocarbon group with a heteroatom;

in the formula (C), Rh represents a hydrocarbon group with 2 to 20 carbon atoms or is optionally a functional group formed by partially substituting the hydrocarbon group with a heteroatom; and Ri, Rj, and Rk are the same or different, and represent hydrogen or a hydrocarbon group with 1 to 16 carbon atoms or are optionally a functional group formed by partially substituting the hydrocarbon group with a heteroatom;

in the formula (D), Z represents a nitrogen, sulfur or phosphorus atom; Rl, Rm, Rn, and Ro are the same or different, and represent a hydrocarbon group with 1 to 20 carbon atoms or are optionally a functional group formed by partially substituting the hydrocarbon group with a heteroatom; provided that Z is a sulfur atom, there is no Ro; and in the formula (E), Rp represents a hydrocarbon group with 1 to 18 carbon atoms or are optionally a functional group formed by partially substituting the hydrocarbon group with a heteroatom.

5. The water dispersion acryl-based pressure-sensitive adhesive composition according to claim 4, wherein the cation of the ionic liquid is at least one kind of cation selected from the group consisting of imidazolium-containing cation, pyridinium-containing cation, morpholinium-containing cation, pyrrolidinium-containing cation, piperidinium-containing cation, ammonium-containing cation, phosphonium-containing cation, and sulfonium-containing cation.

6. The water dispersion acryl-based pressure-sensitive adhesive composition according to claim 4, wherein the ionic liquid comprises at least one kind of cation selected from the group consisting of cations represented by the following formulas (a) to (d):

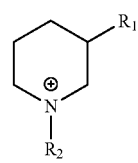

(a)

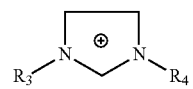

(b)

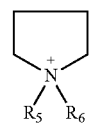

(c)

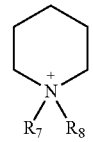

(d)

in the formula (a), R1 represents hydrogen or a hydrocarbon group with 1 to 3 carbon atoms; and R2 represents hydrogen or a hydrocarbon group with 1 to 7 carbon atoms;

in the formula (b), R3 represents hydrogen or a hydrocarbon group with 1 to 3 carbon atoms; and R4 represents hydrogen or a hydrocarbon group with 1 to 7 carbon atoms;

in the formula (c), R5 represents hydrogen or a hydrocarbon group with 1 to 3 carbon atoms; and R6 represents hydrogen or a hydrocarbon group with 1 to 7 carbon atoms; and in the formula (d), R7 represents hydrogen or a hydrocarbon group with 1 to 3 carbon atoms; and R8 represents hydrogen or a hydrocarbon group with 1 to 7 carbon atoms.

7. The water dispersion acryl-based pressure-sensitive adhesive composition according to claim 1, which comprises 0.5 to 3 parts by weight of the ionic compound per 100 parts by weight of the acrylic emulsion-based polymer solid matter.

8. The water dispersion acryl-based pressure-sensitive adhesive composition according to claim 1, which comprises 0.5 to 3 parts by weight of the perfluoroalkyl-containing oligomer per 100 parts by weight of the acrylic emulsion-based polymer solid matter.

9. The water dispersion acryl-based pressure-sensitive adhesive composition according to claim 1, wherein the acrylic emulsion-based polymer is a polymer obtained by polymerization using a reactive emulsifier containing a radical polymerizable functional group in the molecule.

10. The water dispersion acryl-based pressure-sensitive adhesive composition according to claim 1, which further comprises a water-insoluble crosslinking agent having 2 or more functional groups which can be reacted with a carboxyl group in the molecule.

11. A pressure-sensitive adhesive sheet comprising a pressure-sensitive adhesive layer formed of the water dispersion acryl-based pressure-sensitive adhesive composition according to claim 1 on at least one face of a substrate.

12. The pressure-sensitive adhesive sheet according to claim 11, which is a surface protecting film for an optical member.

13. A pressure-sensitive adhesive sheet comprising a pressure-sensitive adhesive layer formed of the water dispersion acryl-based pressure-sensitive adhesive composition according to claim 2 on at least one face of a substrate.

14. A pressure-sensitive adhesive sheet comprising a pressure-sensitive adhesive layer formed of the water dispersion acryl-based pressure-sensitive adhesive composition according to claim 3 on at least one face of a substrate.

15. A pressure-sensitive adhesive sheet comprising a pressure-sensitive adhesive layer formed of the water dispersion acryl-based pressure-sensitive adhesive composition according to claim 4 on at least one face of a substrate.

* * * * *